United States Patent
Weder

(10) Patent No.: US 6,565,963 B2
(45) Date of Patent: *May 20, 2003

(54) PREFORMED FLOWER POT COVER HAVING A FINISH SIMULATING THE APPEARANCE OF CLOTH

(75) Inventor: Donald E. Weder, Highland, IL (US)

(73) Assignee: Southpac Trust International, Inc., Rarotonga (CK)

( * ) Notice: Subject to any disclaimer, the term of this patent is extended or adjusted under 35 U.S.C. 154(b) by 35 days.

This patent is subject to a terminal disclaimer.

(21) Appl. No.: 09/796,661

(22) Filed: Feb. 28, 2001

(65) Prior Publication Data

US 2001/0038892 A1 Nov. 8, 2001

Related U.S. Application Data

(63) Continuation of application No. 09/228,847, filed on Jan. 12, 1999, now Pat. No. 6,387,463, which is a continuation of application No. 09/098,898, filed on Jun. 17, 1998, now abandoned.

(60) Provisional application No. 60/050,867, filed on Jun. 26, 1997.

(51) Int. Cl.[7] .................................................. B23B 33/00
(52) U.S. Cl. .................. 428/317.3; 47/72; 428/156; 428/158; 428/172; 428/212; 428/213
(58) Field of Search ............................... 428/40.1, 42.1, 428/41.8, 41.6, 156, 158, 172, 212, 213, 317.3; 47/72

(56) References Cited

U.S. PATENT DOCUMENTS

| 583,925 A | 6/1897 | McGowan |
|---|---|---|
| 1,794,212 A | 2/1931 | Snyder |
| 1,892,818 A | 1/1933 | Trew |
| 2,268,244 A | 12/1941 | Davis |
| 2,785,508 A | 3/1957 | Coleman, Jr. |
| 3,058,263 A | 10/1962 | Reynolds |
| 3,560,322 A | * 2/1971 | Magid ........................ 161/120 |
| 3,660,187 A | 5/1972 | Shortway et al. |
| 3,911,187 A | 10/1975 | Raley |
| 3,962,503 A | 6/1976 | Crawford |
| 4,104,845 A | 8/1978 | Hoffmann |
| 4,216,620 A | 8/1980 | Weder et al. |
| 4,248,347 A | 2/1981 | Trimbee |
| 4,277,427 A | 7/1981 | Kaminski et al. |
| 4,359,442 A | 11/1982 | Cleminson et al. |
| 4,733,521 A | 3/1988 | Weder et al. |
| 4,773,182 A | * 9/1988 | Weder ........................... 47/72 |
| 5,038,930 A | 8/1991 | Holtkamp, Jr. |
| 5,065,925 A | 11/1991 | Ridenour |
| 5,094,060 A | 3/1992 | Caird |
| 5,105,599 A | 4/1992 | Weder |
| 5,111,637 A | 5/1992 | Weder et al. |
| 5,181,364 A | 1/1993 | Weder |
| 5,254,111 A | 10/1993 | Cancio et al. |
| 5,291,721 A | 3/1994 | Weder et al. |
| 5,296,184 A | 3/1994 | Wu et al. |
| 5,345,745 A | 9/1994 | Weder |
| 5,459,976 A | 10/1995 | Weder et al. |
| 5,609,009 A | 3/1997 | Weder et al. |
| 5,625,979 A | 5/1997 | Weder |

FOREIGN PATENT DOCUMENTS

| DE | 2147277 | 5/1973 |
|---|---|---|
| DE | 2948265 | 5/1981 |

OTHER PUBLICATIONS

Speed Cover ®, The Simple Solution For These Peak Volume Periods, Highland Supply Corporation, 1989.

* cited by examiner

Primary Examiner—Nasser Ahmad
(74) Attorney, Agent, or Firm—Dunlap, Codding & Rogers, P.C.

(57) ABSTRACT

Flexible polymeric materials having a cloth-like appearance suitable for use in the formation of flower pot covers, floral wrappings and ribbon materials are disclosed.

20 Claims, 9 Drawing Sheets

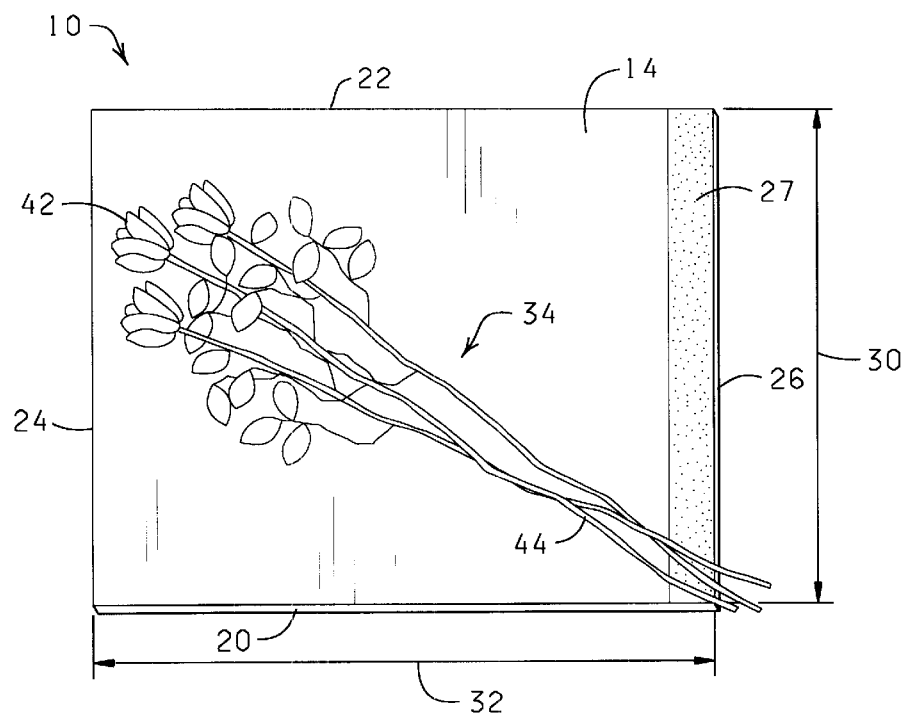
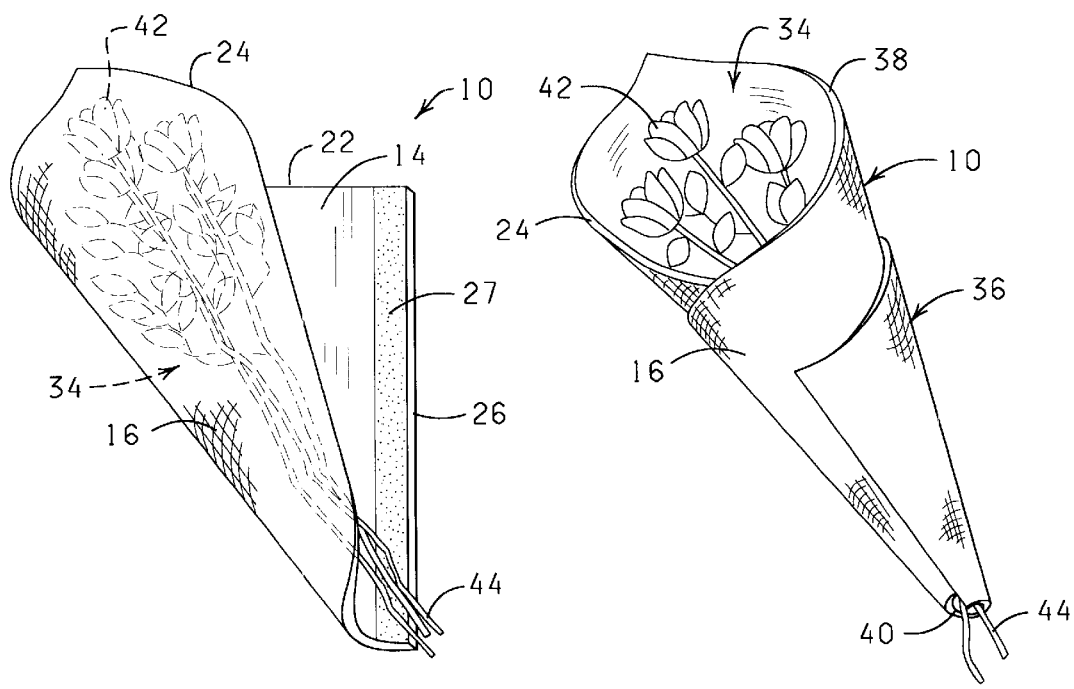
 

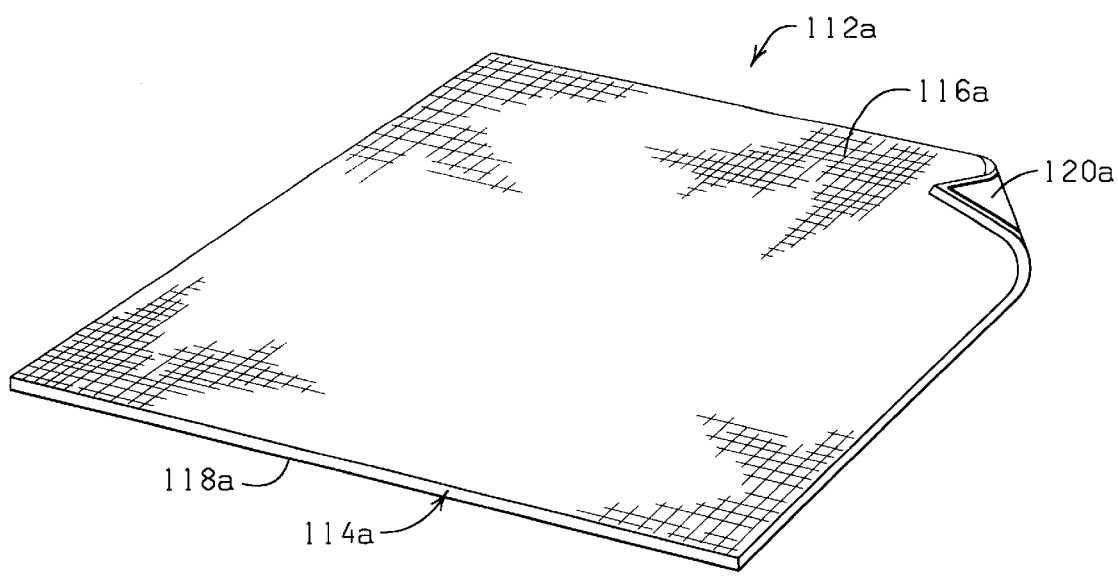
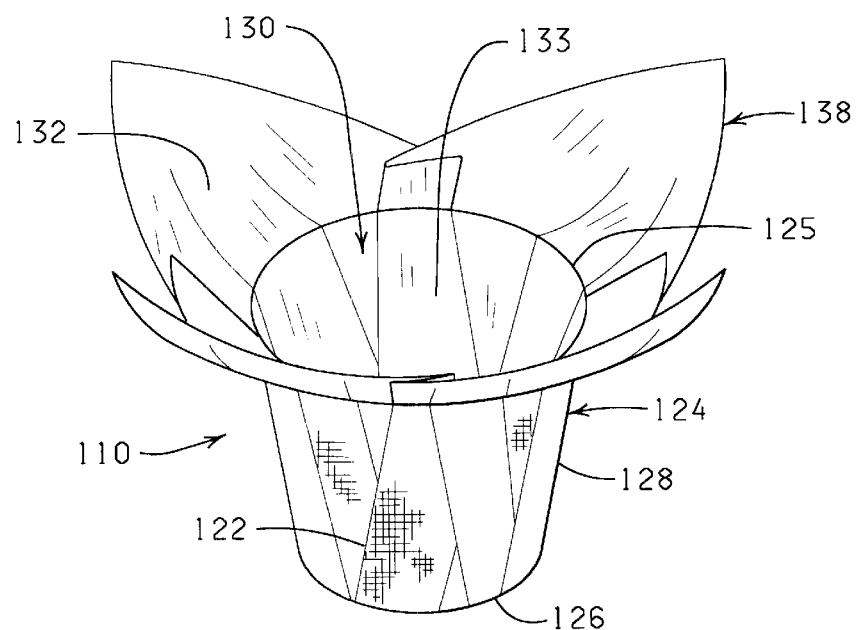
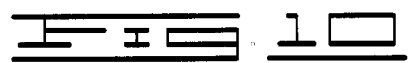

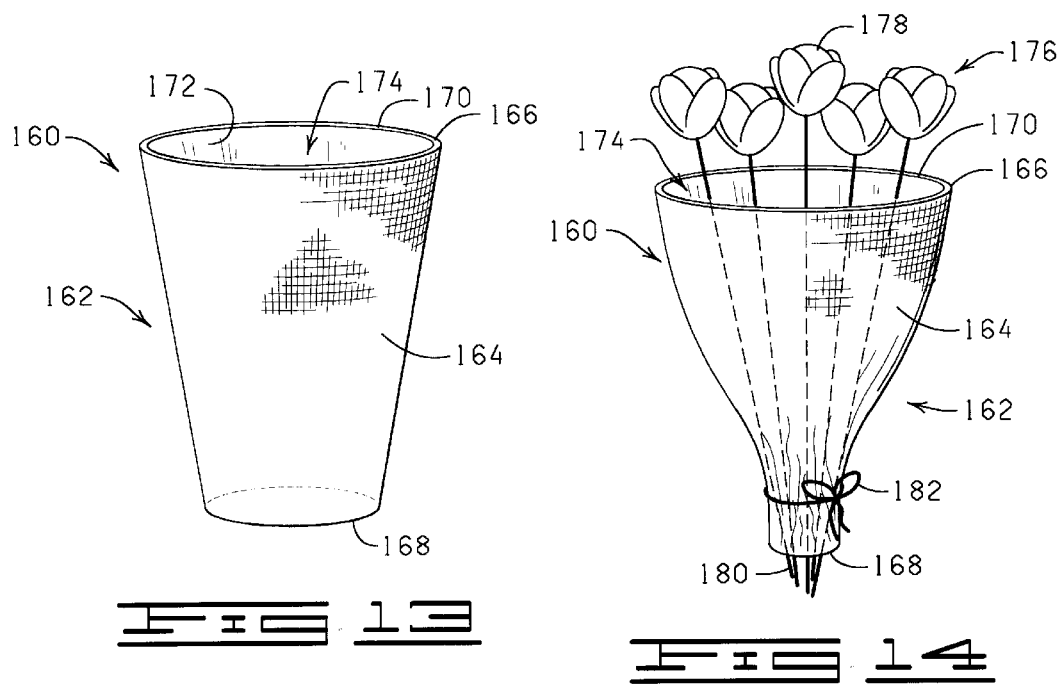
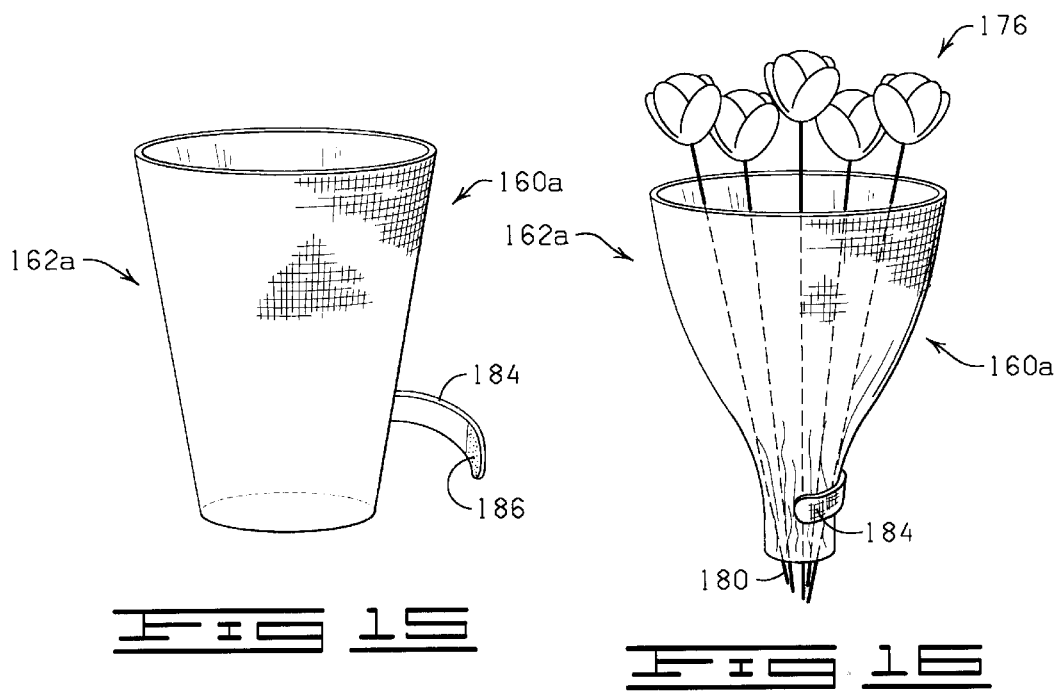

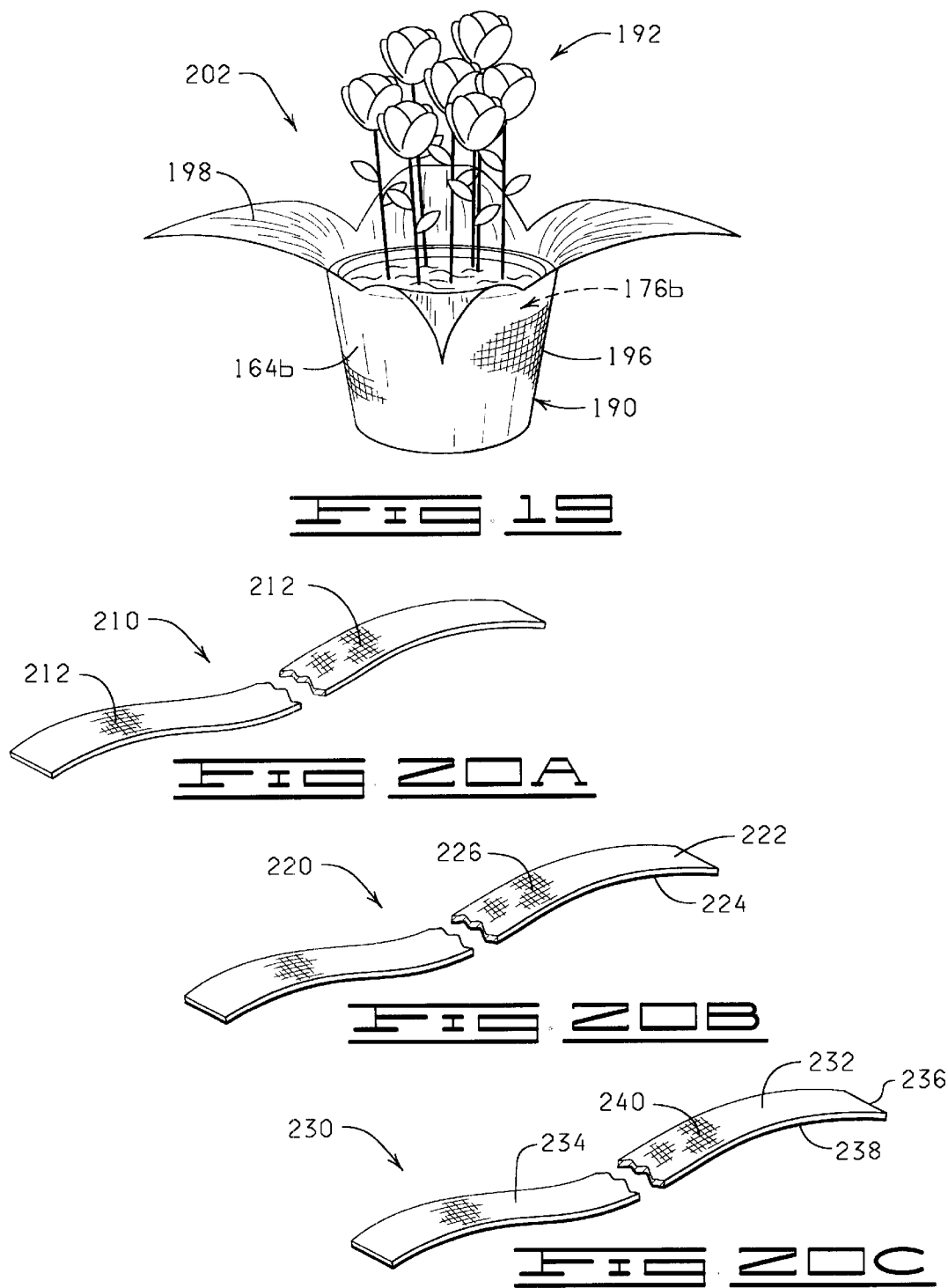

PREFORMED FLOWER POT COVER HAVING A FINISH SIMULATING THE APPEARANCE OF CLOTH

CROSS REFERENCE TO RELATED APPLICATIONS

This application is a continuation of application U.S. Ser. No. 09/228,847, entitled "PRE-FORMED POT COVER HAVING A CLOTH-LIKE APPEARANCE", filed Jan. 12, 1999 now U.S. Pat. No. 6,387,463, which is a continuation of application U.S. Ser. No. 09/098,898, entitled "POLYMERIC MATERIAL HAVING A CLOTH-LIKE APPEARANCE", filed Jun. 17, 1998, now abandoned, which claims the benefit of U.S. Provisional application U.S. Ser. No. 60/050,867, filed Jun. 26, 1997.

FIELD OF THE INVENTION

The present invention relates to polymeric materials having a cloth-appearing finish on a surface thereof, and more particularly but not by way of limitation, to flower pot covers, floral wrappings and ribbon materials made from such polymeric materials. In one aspect, the present invention relates to methods for producing flower pot covers and methods of wrapping floral groupings and flower pots with a sheet of polymeric material having a cloth-appearing finish on a surface thereof to provide a decorative cover for such floral groupings and flower pots.

BRIEF DESCRIPTION OF THE DRAWINGS

FIG. 3 is a perspective view of the sheet of polymeric material having a cloth-appearing finish on a surface thereof of FIG. 2 having a floral grouping disposed thereon.

FIG. 4 is a perspective view of the floral grouping of FIG. 3 being wrapped with the sheet of polymeric material having a cloth-appearing finish on a surface thereof of FIG. 2 by one method of wrapping.

FIG. 5 is a perspective view of a decorative cover for the floral grouping formed from the sheet of polymeric material of FIG. 2 wherein the decorative cover formed from the sheet of material has a conical configuration.

FIG. 9B is a perspective view of a laminated sheet of material having a cloth-appearing finish on a surface thereof wherein the laminated sheet of material comprises a sheet of expanded core polymeric film having a sheet of water impervious polymeric film laminated thereto.

FIG. 10 is a perspective view of a preformed pot cover formed from a sheet of the expanded core polymeric film of FIG. 9A, or a laminated sheet of material of FIG. 9B, or a sheet of the polymeric material having a cloth-appearing finish on a surface thereof similar to the sheet of polymeric material of FIG. 1.

FIG. 13 is a perspective view of a floral sleeve formed from the sheet of polymeric material having a cloth-appearing finish on a surface thereof.

FIG. 14 is a perspective view of the floral sleeve of FIG. 13 disposed about a floral grouping.

FIG. 15 is a perspective view of a floral sleeve having a cinching member wherein the floral sleeve is formed from a sheet of polymeric material having a cloth-appearing finish on a surface thereof.

FIG. 16 is a perspective view of the floral sleeve of FIG. 15 disposed about a floral grouping.

FIG. 19 is a perspective view of a flower pot disposed in the sleeve of FIG. 17 wherein an upper portion of the sleeve has been removed to provide a decorative cover having a skirt.

FIG. 20A is a perspective view of a polymeric ribbon material having a cloth-appearing finish on a surface thereof.

FIG. 20B is a perspective view of a polymeric ribbon material formed of an expanded core polymeric film having an acrylic lacquer on at least one surface thereof.

FIG. 20C is a perspective view of a laminated polymeric ribbon wherein one layer of the laminate is an expanded core polymeric film.

DETAILED DESCRIPTION

Description of FIGS. 1–9

Figure 1:
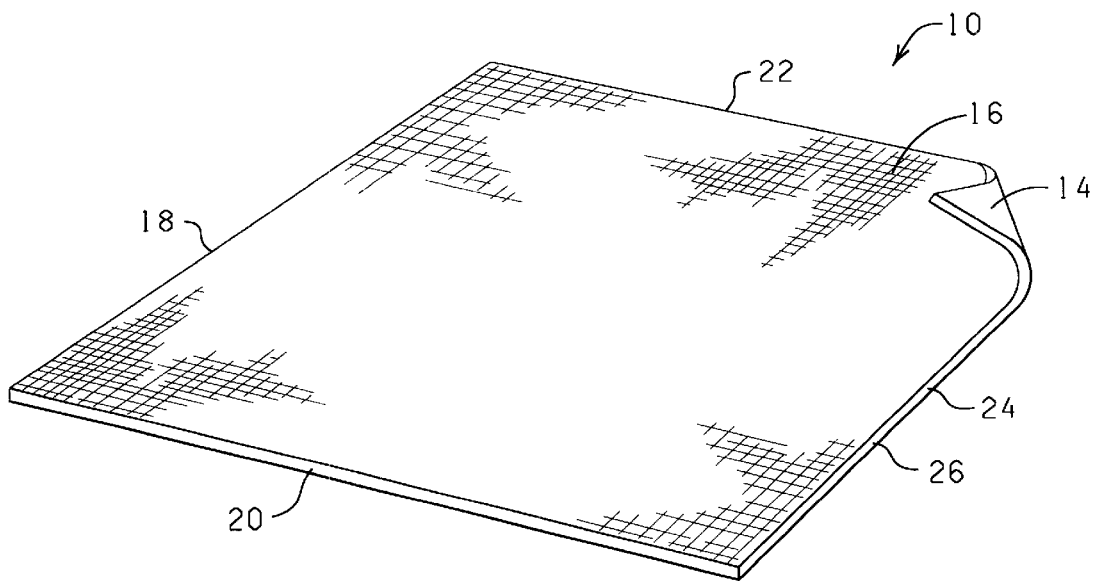
FIG. 1 is a perspective view of a sheet of polymeric material having a cloth-appearing finish on a surface thereof constructed in accordance with the present invention.
Figure 2:
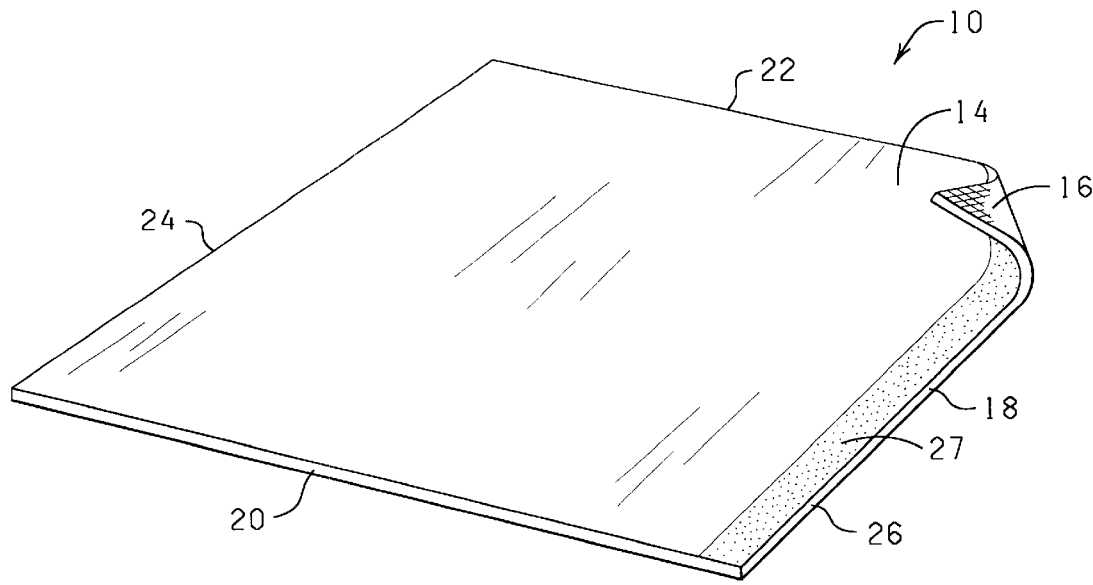
FIG. 2 is a perspective view of the sheet of polymeric material having a cloth-appearing finish on a surface thereof of FIG. 1 having a bonding material disposed along one edge thereof.

Referring now to FIGS. 1 and 2, designated generally by the reference numeral 10 is a sheet of polymeric material having a cloth-like finish or appearance. That is, at least one surface of the sheet of polymeric material 10 has been modified to provide a matte or textured finish simulating the appearance of cloth. The terms "cloth-like finish" and "matte or finish simulating the appearance of cloth" may be used interchangeably. The modification of the sheet of polymeric material 10 to provide the sheet of polymeric material with a matte or textured finish can be accomplished in several ways. For example, a matte finish can be provided by printing a desired pattern on the sheet of polymeric material and thereafter laminating a matte material, such as a translucent polymeric film, over the printed pattern. To further enhance the cloth-like appearance of the sheet of polymeric material 10, the matte material may or may not have a plurality of spatially disposed holes extending therethrough. A matte or textured finish can also be produced by printing a sheet of polymeric material with a matted (i.e. dull finish) ink, by lacquering at least one surface of the sheet of polymeric material with a dull finish lacquer or a matting lacquer, by embossing the sheet of polymeric material to provide an embossed pattern simulating the weave or texture of cloth, or by embossing and printing the sheet of polymeric material to provide embossed and printed patterns wherein the embossed and printed patterns may be in registry, out of registry or wherein a portion of the embossed and printed patterns are in registry and a portion of the embossed and printed patterns are out of registry. In addition, a matte or textured finish capable a providing the sheet of polymeric material with a cloth-like appearance can be achieved by extruding a polymeric resin onto a matted or textured chill roll or by laminating a second sheet of material to the sheet of polymeric material.

The sheet of polymeric material 10 having a cloth-like appearance has an upper surface 14, a lower surface 16, and an outer peripheral edge 18. The lower surface 16 is matted or textured as described above to provide the sheet of polymeric material 10 with a cloth-like appearance. The outer peripheral edge 18 of the sheet of polymeric material 10 comprises a first side 20, a second side 22, a third side 24, and a fourth side 26. A bonding material 27 (FIG. 2) may be disposed on at least a portion of one or both surfaces of the sheet of material 10, such as the upper surface 14 thereof as shown and as further illustrated in U.S. Pat. No. 5,181,364, entitled "WRAPPING A FLORAL GROUPING WITH SHEETS HAVING ADHESIVE OR COHESIVE MATERIAL APPLIED THERETO", issued to Weder on Jan. 26, 1999, the specification of which is hereby expressly incorporated herein by reference.

The sheet of polymeric material 10 having a cloth-like appearance may be employed to provide a decorative cover for a floral grouping (FIGS. 3 through 6) or a decorative cover for a flower pot (FIG. 7); or it may be employed to form a preformed flower pot cover for covering a flower pot (FIGS. 10 and 11); or it may be employed to provide a sleeve for wrapping or covering a floral grouping (FIGS. 13 through 16) or a flower pot (FIGS. 17 through 19); or it may be employed to provide a ribbon material having a cloth-like appearance (FIGS. 20A through 20c). The use of the sheet of polymeric material 10 having a cloth-like appearance to form a decorative cover for a floral grouping or a flower pot, or to form a sleeve for a floral grouping or a flower pot, or to form a preformed flower pot cover, or as a ribbon material will be described in more complete detail herein.

As noted above, the sheet of polymeric material 10 having a cloth-like appearance can be utilized to form a decorative cover for a floral grouping or a flower pot. The term "flower pot" as used herein refers to any type of container for holding a floral grouping, or a plant, or even another pot type container. Examples of flower pots and/or pot type containers include, but are not limited to, clay pots, wooden pots, plastic pots, pots made from natural and/or synthetic fibers, or any combination thereof. Such flower pots and/or pot-type containers are provided with a retaining space for receiving a floral grouping. The floral grouping may be disposed within the retaining space of the flower pot with a suit able growing medium described in further detail below, or other retaining medium, such as a floral foam. It will also be understood that in some cases the floral grouping, and any appropriate growing medium or other retaining medium, may be disposed in a sleeve formed from the sheet of material 10 if the sleeve is adapted to contain a medium.

"Floral grouping" as used herein will be understood to include cut fresh flowers, artificial flowers, a single flower or other fresh and/or artificial plants or other floral materials and may include other secondary plants and/or ornamentation or artificial or natural materials which add to the aesthetics of the overall floral grouping. Further, the floral grouping may comprise a growing potted plant having a root portion as well. However, it will be appreciated that the floral grouping may consist of only a single bloom or only foliage, or a botanical item (not shown), or a propagule. The term "floral grouping" may be used interchangeably herein with the term "floral arrangement". The term "floral grouping" may also be used interchangeably herein with the terms "botanical item" and/or "propagule."

The term "growing medium" when used herein will be understood to include any liquid, solid or gaseous material used for plant growth or for the cultivation of propaguges, including organic and inorganic materials such as soil, humus, perlite, vermiculite, sand, water, and including the nutrients, fertilizers or hormones or combinations thereof required by the plants or propagules for growth.

The term "botanical item" when used herein will be understood to include a natural or artificial herbaceous or woody plant, taken singularly or in combination. The term "botanical item" also includes any portion or portions of natural or artificial herbaceous or woody plants including stems, leaves, flowers, blossoms, buds, blooms, cones, or roots, taken singly or in combination, or in groupings of such portions such as bouquets or floral groupings.

The term "propagule" when used herein will be understood to include any structure capable of being propagated or acting as an agent of reproduction including seeds, shoots, stems, runners, tubers, plants, leaves, roots or spores.

In the embodiments shown in the drawings, the sheet of polymeric material 10 having a cloth-like appearance is square. It will be appreciated, however, that the sheet of polymeric material 10 having a cloth-like appearance can be of any shape, configuration or size as long as the sheet of polymeric material 10 is sufficiently sized and shaped to wrap and encompass a floral grouping or a flower pot. For example, the sheet of polymeric material 10 may have a rectangular, round, oval, octagonal or asymmetrical shape. Further, multiple sheets of the polymeric material 10 may be used in a single circumstance to provide a decorative cover or sleeve for a floral grouping or a flower pot. Moreover, when multiple sheets of the polymeric material 10 having a cloth-like appearance are used in combination, the sheets of polymeric material 10 need not be uniform in size or shape. Finally, it will be appreciated that the sheet of polymeric material 10 having a cloth-like appearance shown herein is a substantially flat sheet except for the texturing, matting, embossing, flocking, application of a foamable lacquer or foamable ink, or other treatments and techniques employed to provide the sheet of polymeric material 10 with the desired texture or matting so that the sheet of polymeric material 10 has the appearance of cloth.

Any thickness or stiffness of the sheet of polymeric material 10 may be utilized in accordance with the present invention as long as the sheet of polymeric material 10 can be modified to provide the sheet of polymeric material 10 with a cloth-like appearance and the sheet of polymeric material 10 having a cloth-like appearance can be wrapped about at least a portion of a floral grouping or a flower pot, as described herein. Generally, the sheet of polymeric material 10 will have a thickness in a range of from about 0.1 mil to about 30 mil, and more desirably a thickness in a range of from about 0.5 mil to about 2.5 mil.

The terms "polymer film", "polymeric film" and "polymeric material" when used herein will be understood to refer to a synthetic polymer such as a polypropylene, a naturally occurring polymer such as cellophane, an extruded polymeric material having an expanded core such as extruded polypropylene having an expanded core and combinations thereof, including but not limited to, laminated materials. The extruded polymeric material having an expanded core (which is sometimes referred to herein as an expanded core polymeric material) will generally have a thickness in the range of from about 0.6 mil to about 10 mil, more desirably in the range of from about 0.6 mil to about 1.25 mil. "Extruded polymeric material having an expanded core" as used herein refers to any extrudable polymeric material in which the core is expanded during extrusion, such as by incorporation of a blowing agent in the polymeric resin which is being extruded.

The sheet of material 10 may also be constructed, in whole or in part, from a cling material. "Cling material" when used herein includes any material which is capable of connecting to the sheet of material and/or itself upon contacting engagement during the wrapping process and is wrappable about an item whereby portions of the cling material contactingly engage and connect to other portions of another material, or, alternatively, itself, for generally securing the material wrapped about at least a portion of a flower pot. This connecting engagement is preferably temporary in that the material may be easily removed, i.e., the cling material "clings" to the flower pot.

The cling material is constructed, and treated if necessary, from polyethylene such as Cling Wrap made by Glad®, First Brands Corporation, Danbury, Conn. The thickness of the cling material will, in part, depend upon the size of sleeve and the size of the flower pot in the sleeve, i.e., generally, a larger flower pot may require a thicker and therefore stronger cling material. The cling material will range in thickness from about 0.1 mil to about 10 mil, and preferably from about 0.5 mil to about 2.5 mil and most preferably from about 0.6 mil to about 2 mil. However, any thickness of cling material may be utilized in accordance with the present invention which permits the cling material to be modified as hereinbefore described to provide the cling material with a cloth-like appearance.

In one embodiment, a sleeve may be constructed from two sheets of polypropylene film wherein at least a lower or outer surface of one of the sheets of polypropylene film is modified as hereinbefore described to provide at least one of the sheets of polypropylene film with a cloth-like appearance. The sheets of polypropylene film employed to produce the sleeve may be connected together or laminated or may be separate layers. In an alternative embodiment, the sleeve may be constructed from only one sheet of polypropylene film having a cloth-like appearance.

The sheet of polymeric material 10 having a cloth-like appearance may vary in color. Further, the sheet of polymeric material 10 may comprise other decorative patterns or designs in addition to the matting, texturing, flocking, application of flammable lacquers or foamable inks, or embossing employed to impart the cloth-like appearance to the sheet of polymeric material 10.

As illustrated in FIG. 3, the sheet of polymeric material 10 has a width 30 extending generally between the first side 20 and the second side 22, respectively, sufficiently sized whereby the sheet of polymeric material 10 can be wrapped about and encompass a floral grouping or a flower pot. The sheet of polymeric material 10 has a length 32 extending generally between the third side 24 and the fourth side 26, respectively, sufficiently sized whereby the sheet of polymeric material 10 extends over a substantial portion of the floral grouping when the sheet of polymeric material 10 has been wrapped about the floral grouping in accordance with the present invention, as described in detail herein. The sheet of polymeric material 10 may also be wrapped about a flower pot to substantially wrap and cover the flower pot in accordance with the present invention.

A plurality of sheets of polymeric material 10 having a cloth-like appearance may be connected together to form a roll as is shown in U.S. Pat. No. 5,459,976, issued to Weder et al. on Oct. 24, 1995, entitled "MATERIAL AND ADHESIVE STRIP DISPENSER", the specification of which is hereby expressly incorporated in its entirety herein by reference.

FIGS. 3–5 illustrate the use of the sheet of polymeric material 10 having a cloth-like appearance in wrapping a floral grouping 34 to provide a decorative cover 36 (FIG. 5) for the floral grouping 34 wherein the decorative cover 36 has an open upper end 38 and a lower end 40. The sheet of polymeric material 10 may optionally have the strip of bonding material 27 disposed upon the upper surface 14, the lower surface 16 or both, such as the strip of bonding material 27 disposed along at least a portion of the upper surface 14 of the sheet of polymeric material 10 so as to be disposed substantially adjacent the fourth side 26 thereof substantially as shown in FIGS. 3 and 4. Further, the sheet of polymeric material 10 having a cloth-like appearance can be provided either as an individual sheet or from a pad or roll of material.

The bonding material 27, if present, may have a backing or release strip (not shown). The backing or release strip may be left applied for a period of time to the bonding material 27 after it is disposed on a surface of the sheet of polymeric material 10 prior to its use as a wrapping material, to protect the bonding qualities of the bonding strip. In operation, an operator may dispose the sheet of polymeric material 10 having a cloth-like appearance on a support surface (not shown)such that the lower surface 16 of the sheet of polymeric material 10 (which has been modified to provide the sheet of polymeric material 10 with a cloth-like appearance) is in contact with the support surface.

Referring more specifically to FIGS. 3–5, the floral grouping 34 is placed upon the upper surface 14 of the sheet of polymeric material 10 in a diagonal orientation. The floral grouping 34 has an upper bloom or foliage portion 42 and a lower stem portion 44. The sheet of polymeric material 10 is then wrapped about the floral grouping 34 by the operator (FIGS. 4 and 5), the operator overlapping a portion of the sheet of polymeric material 10 over another portion of the sheet of polymeric material 10. That is, for example, the operator places the first side 20 of the sheet of polymeric material 10 over the floral grouping 34, as shown in FIG. 4. The operator continues to roll the floral grouping 34 and the sheet of polymeric material 10 in the direction toward the second side 22 of the sheet of polymeric material 10 until the upper surface 14 near second side 22 firmly engages the lower surface 16 of the sheet of polymeric material 10, wherein the floral grouping 34 is substantially encompassed by the sheet of polymeric material 10, and wherein the bonding material 27 contacts the sheet of polymeric material 10 to provide the decorative cover 36 having a cloth-like appearance which substantially encompasses and surrounds a substantial portion of the floral grouping 34. FIG. 5 shows the floral grouping 34 wrapped in a conical fashion to provide the decorative cover 36 for the floral grouping 34 which has the appearance of being made of a cloth material. When the floral grouping 34 is wrapped in a conical fashion, the bloom portion 42 of the floral grouping 34 is exposed near the open upper end 38 of the decorative cover 36, and the stem portion 44 of the floral grouping 34 is exposed near the lower end 40 of the decorative cover 36.

Figure 6:
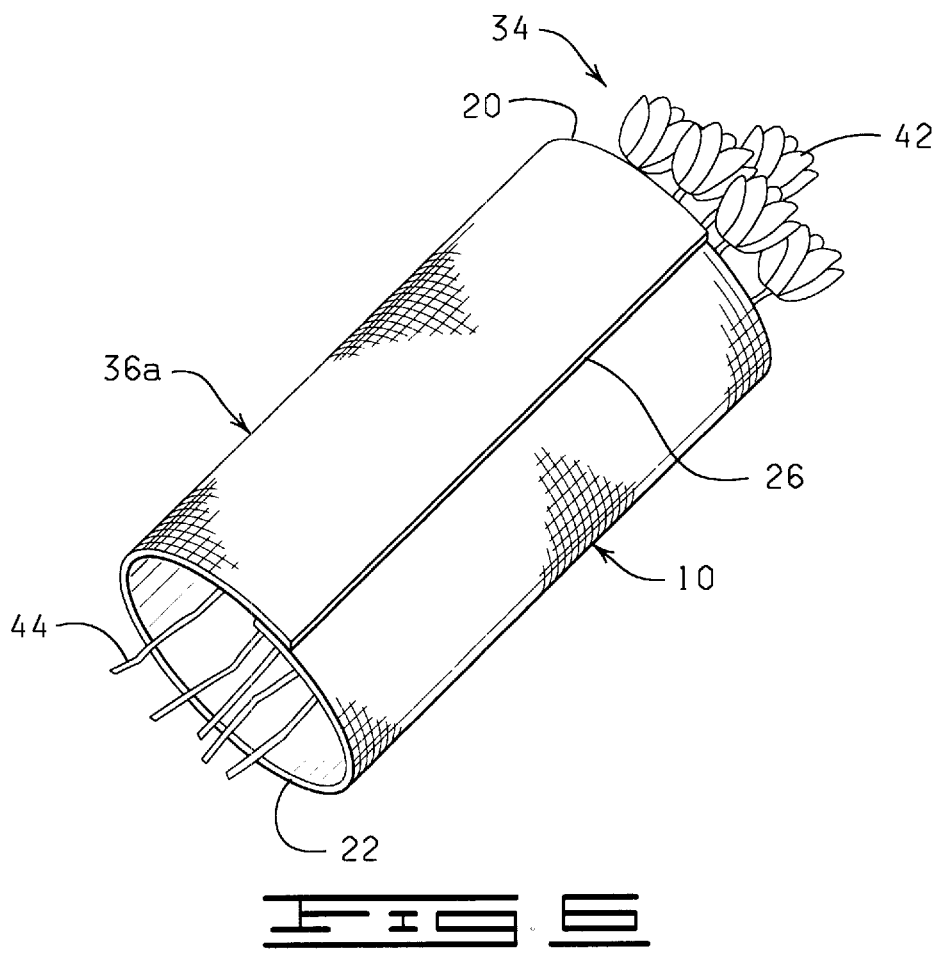
FIG. 6 is a perspective view of a decorative cover formed from the sheet of polymeric material of FIG. 2 wherein a floral grouping is wrapped with the sheet of polymeric material having a cloth-appearing finish on a surface thereof by a second method of wrapping so that the decorative cover formed from the sheet of polymeric material having a cloth-appearing finish on a surface thereof has a substantially cylindrical configuration.

In another embodiment, illustrated in FIG. 6, the sheet of polymeric material 10 having a cloth-like appearance is utilized to wrap the floral grouping 34 in a cylindrical fashion. The floral grouping 34 is disposed upon the sheet of polymeric material 10 approximately parallel to the third side 24 of the sheet of polymeric material 10. The sheet of polymeric material 10 is wrapped generally about the stem portion 44 of the floral grouping 34 to a position wherein the third side 24 of the sheet of polymeric material 10 generally overlaps the fourth side 26 of the sheet of polymeric material 10 in a cylindrical fashion. It should be noted that the sheet of polymeric material 10 may be wrapped a plurality of times about the stem portion 44 of the floral grouping 34 before the overlapping of the third side 24 and the fourth side 26 of the sheet of polymeric material 10. As before, the portion of the sheet of polymeric material 10 near the third side 24 is disposed generally adjacent another portion of the sheet of polymeric material 10 and the two adjacent portions then are brought into contact where they may be bondingly engaged, thereby securing the sheet of polymeric material 10 generally about the floral grouping 34 so as to provide a decorative cover 36*a* for the floral grouping 34 which has the appearance of being fabricated of cloth.

Figure 7:
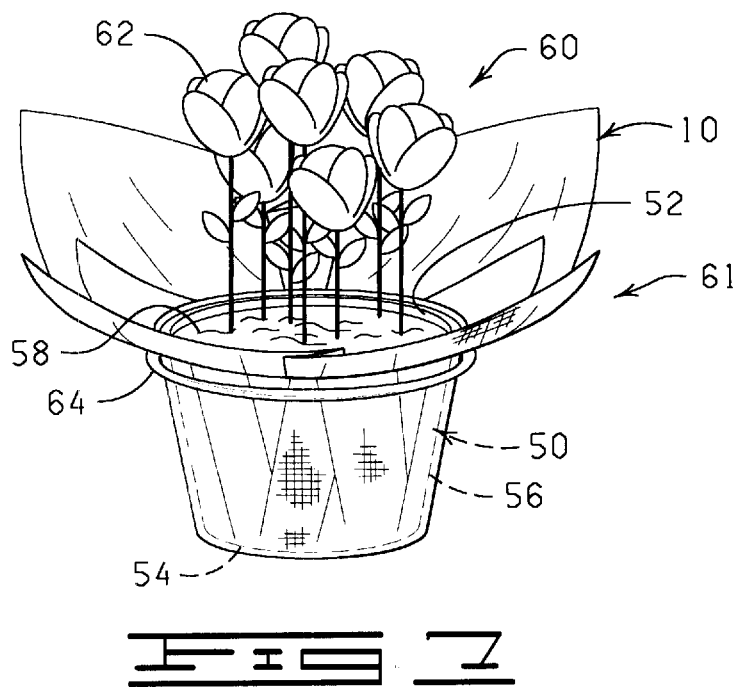
FIG. 7 is a perspective view of a decorative cover positioned about a flower pot wherein the decorative cover is formed from the sheet of polymeric material having a cloth-appearing finish on a surface thereof of FIG. 1.

In another version of the invention, the sheet of polymeric material 10 having a cloth-like appearance may be used to wrap a flower pot or pot-type container, as noted above. Shown in FIG. 7 is a flower pot designated by the reference numeral 50 having an open upper end 52, a bottom end 54, an outer peripheral surface 56, an inner retaining space 58 within which may be disposed a growing medium. The flower pot 50 may contain a botanical item, such as a plant 60, which has an upper portion 62 comprising blooms or foliage or both.

The sheet of polymeric material 10 having a cloth-like appearance may be wrapped about the flower pot 50 by any one of numerous methods used to wrap sheets of material about flower pots to form decorative pot covers for flower pots, such as a decorative cover 61 having a cloth-like appearance disposed about the flower pot 50 illustrated in FIG. 7. The sheet of polymeric material 10 may, for example, be formed by hand about the outer peripheral surface 56 of the flower pot 50 to produce the decorative cover 61 which has the appearance of being fabricated of cloth. The decorative cover 61 can then be secured about the flower pot 50 by a bonding material or by an elastic band 64 such that the open upper end 52 of the flower pot 50 remains substantially uncovered by the decorative cover 61 substantially as shown in FIG. 7.

Figure 8:
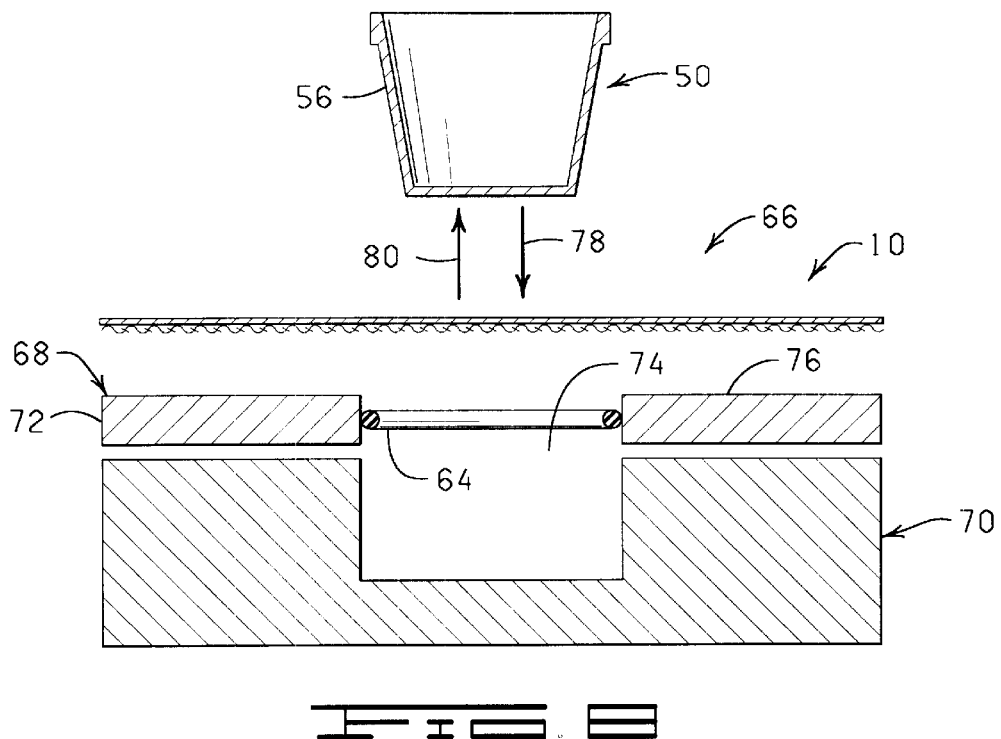
FIG. 8 is a cross-sectional view of a flower pot cover former and band applicator apparatus having the sheet of polymeric material having a cloth-appearing finish on a surface thereof of FIG. 1 disposed above an opening of the flower pot cover former and band applicator and having a flower pot disposed above the sheet of polymeric material having a cloth-appearing finish on a surface thereof.

Referring now to FIG. 8, a flower pot cover former and band applicator apparatus 66 for forming the sheet of polymeric material 10 having a cloth-like appearance into the decorative cover 61 for the flower pot 50 of FIG. 7 is illustrated. The flower pot cover former and band applicator apparatus 66 comprises a band applicator 68 and a flower pot cover former 70. The flower pot cover former and band applicator apparatus 66 has a support platform 72 with an opening 74 formed therein. A band, such as elastic band 64, is disposed circumferentially about the opening 74 in the support platform 72.

The lower surface 16 of the sheet of polymeric material 10 (which has been modified to provide the sheet of polymeric material 10 with a textured or matted surface simulating cloth) is positioned on an upper surface 76 on the support platform 72 such that the sheet of polymeric material 10 is positioned over the opening 74 in the support platform 72. The flower pot 50 is positioned above the sheet of polymeric material 10 and is moved in a direction 78 into the opening 74 of the flower pot cover former and band applicator apparatus 66. As the flower pot 50 is moved into the opening 74, the sheet of polymeric material 10 is pressed about the outer peripheral surface 56 of the flower pot 50 thereby forming the decorative cover 61 about the flower pot 50. The decorative cover 61 (which has a cloth-like appearance) is then secured about the flower pot 50 by the elastic band 64. The flower pot 50 having the decorative cover 61 secured thereto is then moved in a direction 80 out of the opening 74 in the support platform 72.

The elastic band 64 can be applied manually or automatically such as by the method shown in U.S. Pat. No. 5,105,599, entitled "MEANS FOR SECURING A DECORATIVE COVER ABOUT A FLOWER POT", issued to Weder on Apr. 21, 1993 which is hereby expressly incorporated herein by reference. The band 64 can also be applied as a tie using a method such as described in "Single Station Covering and Fastening System", U.S. Pat. No. 5,609,009, issued to Weder et al. on Mar. 11, 1997, the specification of which is hereby expressly incorporated herein by reference. The sheet of polymeric material 10 having a cloth-like appearance can also be applied automatically about the flower pot 50, for example, by methods shown in U.S. Pat. No. 4,733,521 entitled "COVER FORMING APPARATUS" issued to Weder et al. on Mar. 29, 1988, and U.S. Pat. No. 5,291,721, entitled "COVER FORMING APPARATUS HAVING A VOTING FORMING MEMBERS", issued to Weder et al. on Mar. 8, 1994, both of which are hereby expressly incorporated herein by reference.

Instead of securing the decorative cover 61 about the flower pot 50 via the band 64, the decorative cover 61 formed from the sheet of polymeric material 10 having a cloth-like appearance may be secured to the flower pot 50 by the use of one or more bonding materials. For example, the upper surface 14 of the sheet of polymeric material 10 may have a bonding material such as the bonding material 27 disposed upon a portion thereof. When the sheet of polymeric material 10 is disposed about the flower pot 50, at least a portion of the upper surface 14 of the sheet of polymeric material 10 contacts the outer peripheral surface 56 of the flower pot 50 and is thereby bonded and held about the flower pot 50 via the bonding material.

The bonding material may cover a portion of the upper surface 14 of the sheet of polymeric material 10, or the bonding material may entirely cover the upper surface 14 of the sheet of polymeric material 10. The bonding material may be disposed on the upper surface 14 of the sheet of polymeric material 10 in the form of a strip or in the form of spaced-apart spots. One method for disposing a bonding material on the sheet of polymeric material 10 is described in U.S. Pat. No. 5,111,637, entitled "Method For Wrapping A Floral Grouping", issued to Weder, et al. on May 12, 1992, which is expressly incorporated herein by reference.

The term "bonding material" when used herein refers to an adhesive, frequently a pressure sensitive adhesive, or a cohesive or any adhesive/cohesive combination having adhesive qualities (i.e., qualities of adhesion or adhesion/cohesion, respectively) sufficient to cause the attachment of a portion of the sheet of polymeric material 10 to itself, to a floral grouping 34, or to a flower pot 50. Since the bonding material may comprise either an adhesive or an adhesive/cohesive combination, it will be appreciated that both adhesives and cohesives are known in the art, and both are commercially available. When the bonding material is a cohesive, a similar cohesive material must be placed on the adjacent surface for bondingly contacting and bondingly engaging with the cohesive material. The term "bonding material" also includes materials which are heat sealable and, in this instance, the adjacent portions of the material must be brought into contact and then heat must be applied to effect the seal. The term "bonding material" also includes materials which are sonically sealable and vibratory sealable. The term "bonding material" when used herein also includes a heat sealing lacquer or hot melt material which may be applied to the material and, in this instance, heat, sound waves, or vibrations, also must be applied to effect the sealing.

The term "bonding material" when used herein also includes any type of material or thing which can be used to effect the bonding or connecting of the two adjacent portions of the sheet of polymeric material 10 to effect the connection or bonding described herein. The term "bonding material" may also include ties, labels, bands, ribbons, strings, tapes (including single or double-sided adhesive tapes), staples or combinations thereof. Some of the bonding materials would secure the ends of the material while other bonding materials may bind the circumference of a cover, or a sleeve, or, alternatively and/or in addition, the bonding materials would secure overlapping folds in the material and/or sleeve. Another way to secure the cover and/or sleeve is to heat seal the ends of the material to another portion of the material. One way to do this is to contact the ends with an iron of sufficient heat to heat seal the material.

Alternatively, a cold seal adhesive may be utilized as the bonding material. The cold seal adhesive adheres only to a similar substrate, acting similarly as a cohesive, and binds only to itself. The cold seal adhesive, since it bonds only to a similar substrate, does not cause a residue to build up on equipment, thereby both permitting much more rapid disposition and use of such equipment to form articles and reducing labor costs. Further, since no heat is required to effect the seal, the dwell time, that is, the time for the sheet of material to form and retain the shape of an article, such as a flower pot cover or flower pot, is reduced. A cold seal adhesive binds quickly and easily with minimal pressure, and such a seal is not readily releasable. This characteristic is different from, for example, a pressure sensitive adhesive.

The term "bonding material" when used herein also includes any heat or chemically shrinkable material, and static electrical or other electrical materials, chemical welding materials, magnetic materials, mechanical or barb-type fastening materials or clamps, curl-type characteristics of the film or materials incorporated in material which can cause the material to take on certain shapes, cling films, slots, grooves, shrinkable materials and bands, curl materials, springs, and any type of welding method which may weld portions of the material to itself or to the pot, or to both the material itself and the pot.

Description of FIGS. 9–12

Figure 9A:
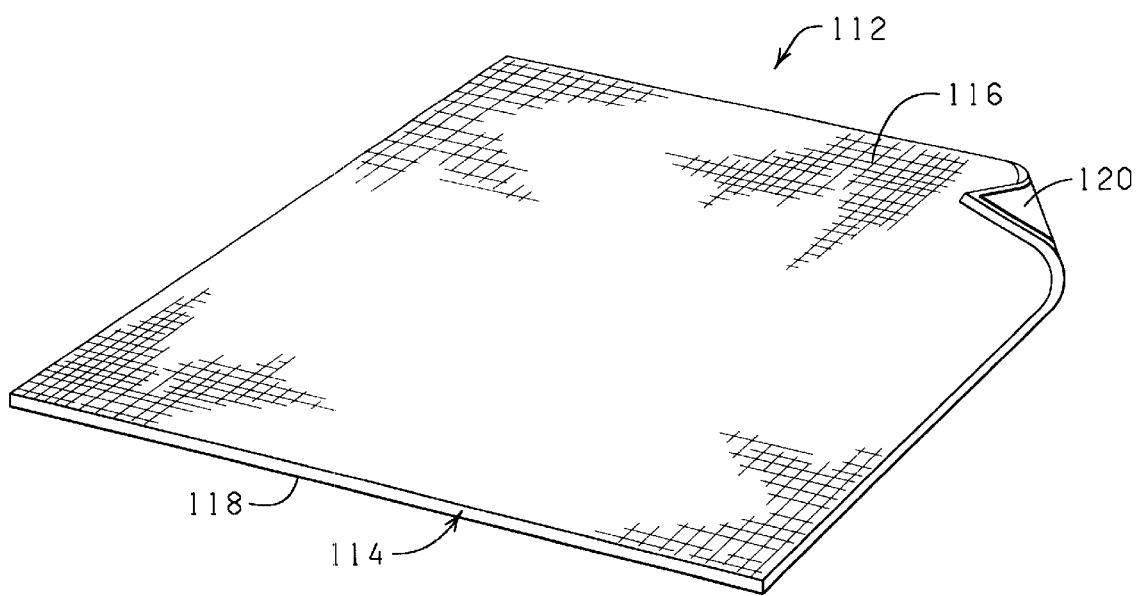
FIG. 9A is a perspective view of a sheet of expanded core polymeric film having a cloth-appearing finish on a surface thereof wherein an acrylic heat sealable lacquer is disposed on at least one surface thereof.
Figure 11:
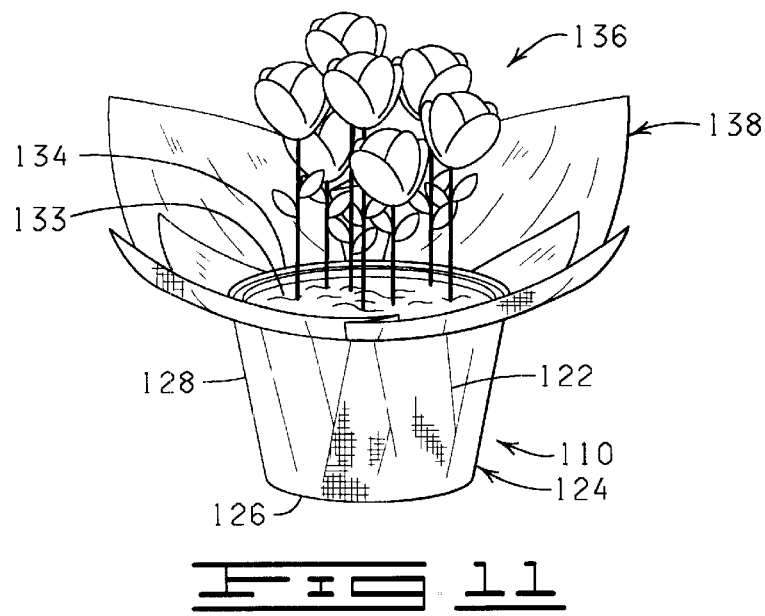
FIG. 11 is a perspective view of the preformed pot cover of FIG. 10 having a flower pot disposed therein.

Referring now to FIGS. 9 through 11, a decorative preformed flower pot cover 110 illustrated in FIGS. 10 and 11 is constructed from a sheet of flexible material 112 having a cloth-like appearance (FIG. 9A) or a laminated sheet of flexible material 112a (FIG. 9B). It should be understood that a sheet of material similar to the sheet of polymeric material 10 having a cloth-like appearance hereinbefore described can also be employed to form the decorative preformed pot cover 110. In the embodiment shown in FIG. 9A, the sheet of flexible material 112 used in the construction of the decorative preformed flower pot cover 110 comprises a sheet of expanded core polymeric film 114 having an upper surface 116, a lower surface 118 and a thickness in the range of from about 0.6 mil to about 10 mil, more desirably in the range of from about 0.6 mil to about 1.25 mil, and a coating of an acrylic heat sealable lacquer 120 disposed on at least one of the upper and lower surfaces 116 and 118, respectively, of the sheet of expanded core polymeric film 114. While the decorative preformed flower pot cover 110 is shown as being formed of the sheet of flexible material 112 having a matte or textured finish simulating the appearance of cloth, it should be understood that the decorative preformed flower pot cover 110 can also be formed from a sheet of flexible material 112 comprising a sheet of expanded core polymeric film 114 having a coating of acrylic heat sealable lacquer 120 disposed on at least one surface thereof wherein the surface of the sheet of expanded core polymeric film 114 is not modified to provide a cloth-like appearance.

As previously stated, the modification of the sheet of expanded core polymeric film 114 to provide the sheet of flexible material 112 with the desired matte or textured finish can be accomplished by printing a desired pattern on the sheet of expanded core polymeric film 114 and thereafter laminating a matte material, such as a translucent polymeric film, over the printed pattern. To further enhance the cloth-like appearance, the matte material may or may not have a plurality of spatially disposed holes extending therethrough. A matte or textured finish can also be produced by printing a sheet of expanded core polymeric film 114 with a matted (i.e. dull finish) ink, by lacquering at least one surface of the sheet of expanded core polymeric film 114 with a dull finish lacquer or a matting lacquer, by embossing the sheet of expanded core polymeric film 114 to provide an embossed pattern simulating the weave or texture of cloth, or by embossing and printing the sheet of expanded core polymeric film 114 to provide embossed and printed patterns wherein the embossed and printed patterns may be in registry, out of registry or wherein a portion of the embossed and printed patterns are in registry and a portion of the embossed and printed patterns are out of registry. In addition, a matte or textured finish capable a providing the sheet of flexible polymeric film 114 with a cloth-like appearance can be achieved by extruding a polymeric resin onto a matted or textured chill roll to produce the sheet of expanded core polymeric film 114 or by laminating a second sheet of material to the sheet of expanded core polymeric film 114. When the sheet of flexible material 112 is formed into the decorative preformed flower pot cover 110, a plurality of overlapping folds 122 are formed and at least a portion of the overlapping folds 122 are connected to adjacently disposed portions of the decorative preformed flower pot cover 110 via the acrylic heat sealable lacquer 120.

As shown in FIGS. 10 and 11, the decorative preformed pot cover 110 has a base 124 having an open upper end 125, a lower end 126, and an outer peripheral surface 128. An opening 130 intersects the open upper end 125 of the base 124 of the decorative preformed flower pot cover, forming an inner peripheral surface 132 which defines and encompasses a retaining space 133 within which a flower pot 134 containing a floral grouping 136 may be disposed in a manner well known in the art (FIG. 11). The decorative preformed flower pot cover 110 is further provided with a decorative border 138 which extends outwardly from the open upper end 125 of the base 124. Desirably, at least a portion of one surface of one of the base 124 and the decorative border 138 of the decorative border 138 of the decorative, preformed flower pot cover 110 is provided with a matte or textured finish simulating the appearance of cloth.

As stated above, the decorative preformed flower pot cover 110 is provided with a plurality of overlapping folds 122 which are formed in the base 124 thereof, and at least a portion of the overlapping folds 122 are connected so that the decorative preformed flower pot cover 110 may be substantially flattened and then unflattened to assume the original shape of the decorative preformed flower pot cover 110. A substantial portion of the overlapping folds 122 extend over different distances and at various and arbitrary angles. The decorative border 138 of the decorative preformed flower pot cover 110 is substantially free of permanently connected overlapping folds.

In another embodiment, a laminated sheet of flexible material 112a (FIG. 9B) is used in the construction of the decorative preformed flower pot cover 110. The laminated sheet of flexible material 112a is a laminated material which comprises a sheet of expanded core polymeric film 114a having an upper surface 116a, and a lower surface 118a, and a substantially water impervious polymeric film 120a. At least one surface of the sheet of expanded core polymeric film 114a or substantially water impervious polymeric film 120a is modified to provide the laminated sheet of flexible material 112a with the desired cloth-like appearance. It should be understood that the decorative preformed flower pot cover 110 can also be formed from a laminated sheet of flexible material 112a comprising a sheet of expanded core polymeric film 114a and a substantially water impervious polymeric film 120a wherein neither the sheet of expanded core polymeric film 114a nor the substantially water impervious polymeric film 120a is modified to provide the laminated sheet of flexible material 112a with the desired cloth-like appearance.

The sheet of expanded core polymeric film 114a desirably has a thickness in a range of from about 0.6 mil to about 10 mil, and more desirably from about 0.6 mil to about 1.25 mil, and the substantially water impervious polymeric film 120a desirably has a thickness in a range of from about 0.6 mil to about 10 mil. The substantially water impervious polymeric film 120a is desirably laminated to the sheet of expanded core polymeric material 114a with a colored adhesive so as to impart a desired color to the laminated sheet of flexible material 112a. While the thickness of the laminated sheet of flexible material 112a can vary widely, and will generally depend on the thickness of the sheet of expanded core polymeric film 114a and the thickness of the substantially water impervious polymeric film 120a, desirable results can be obtained where the laminated sheet of flexible material 112a has a thickness in the range of from about 1.5 mil to about 2.5 mil.

As previously stated, the decorative preformed flower pot cover 110 may be constructed of the sheet of flexible material 112 (FIG. 9A), or from the laminated sheet of flexible material 112a (FIG. 9B), or from the sheet of polymeric material 10 (FIG. 1); and the decorative preformed flower pot cover 110 so formed will have a plurality of overlapping folds 122 formed therein, at least a portion thereof being connected. If desired, the decorative preformed flower pot cover 110 can be formed of a plurality of sheets of the same and/or different types of material.

The method and apparatus employed to form the preformed flower pot cover is substantially identical whether one uses one or more sheets of the flexible material 112 (FIG. 9A), or one or more laminated sheets of the flexible material 112a (FIG. 9B), or one or more sheets of polymeric material 10 (FIG. 1) or a combination of such sheets of material. Thus, only the formation of the preformed flower pot cover 110 using a sheet of the flexible material 112 of FIG. 9 will be described in detail hereinafter.

Figure 12:
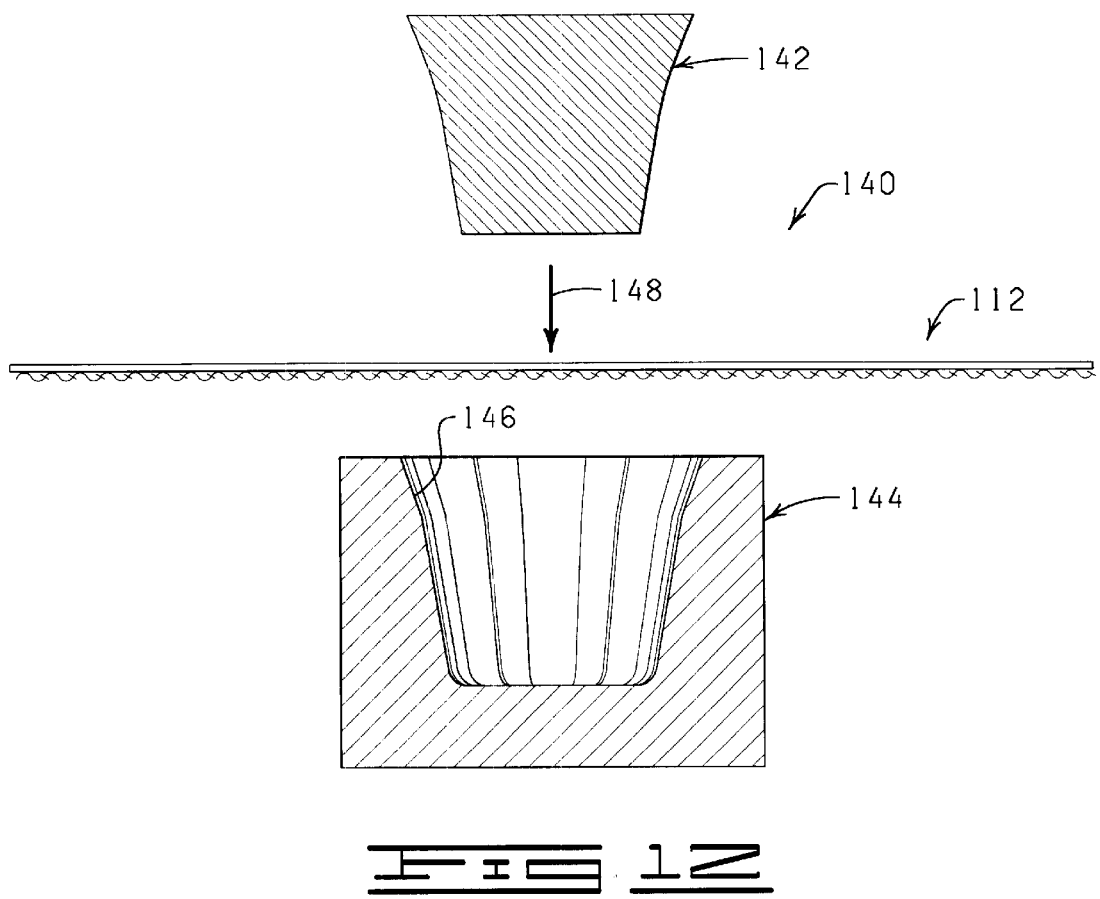
FIG. 12 is a diagrammatic, cross-sectional view of a male and female mold having a sheet of the expanded core polymeric film of FIG. 9A disposed therebetween for forming the preformed pot cover of FIG. 10.

The decorative preformed flower pot cover 110 may be formed using a conventional mold system 140 comprising a male mold 142 and a female mold 144 having a mold cavity 146 for matingly receiving the male mold 142 (FIG. 12). The sheet of flexible material 112 is positioned between the male and female molds 142 and 144, respectively. Movement of the male mold 142 in the direction 148 and into the mold cavity 146 forces the sheet of flexible material 112 to be disposed about the portion of the male mold 142 disposed in the mold cavity 146 of the female mold 146 and thereby forms the sheet of material 112 into the preformed decorative flower pot cover 110 (FIGS. 10 and 11). Further, in accordance with the present invention, the decorative preformed flower pot cover 110 constructed from the materials described herein above, may have a bonding material disposed upon a portion thereof.

Methods for forming such preformed decorative pot covers are well known in the art. Two methods of forming such covers are described in U.S. Pat. No. 4,773,182, entitled "ARTICLE FORMING SYSTEM" issued to Weder et al. on Sep. 27, 1998, and U.S. Pat. No. 5,291,721, entitled "COVER FORMING APPARATUS HAVING A VOTING FORMING MEMBERS", issued to Weder et al. on Mar. 8, 1994, each of which is expressly incorporated herein by reference.

Description of FIGS. 13–19

Shown in FIG. 13 is a decorative cover designated therein by the general reference numeral 160 which comprises a flexible bag or sleeve 162 of unitary construction having a cloth-like appearance in accordance with the present invention. The sleeve 162 may be used as a decorative cover 160 for a floral grouping or a flower pot. The sleeve 162 initially comprises a flexible flat collapsed piece of material which is openable in the form of a tube or sleeve. Such sleeves are well known in the floral industry. Further, in accordance with the present invention, at least a portion of one surface, preferably an outer peripheral surface 164 of the sleeve 162, has been modified to provide with sleeve 162 with a cloth-like appearance, as previously described herein. The sleeve 162 has an upper end 166, a lower end 168 and the outer peripheral surface 164. The sleeve 162 may be tapered outwardly from the lower end 168 toward a larger diameter at its upper end 166. In its flattened state the sleeve 162 generally has an overall trapezoidal or modified trapezoidal shape, and when opened is substantially frusto-conical to coniform. It will be appreciated, however, that the sleeve 162 may comprise variations on the aforementioned shapes or may comprise significantly altered shapes such as square or rectangular, wherein the sleeve 162 when opened has a cylindrical form, as long as the sleeve 162 functions in accordance with the present invention in the manner described herein. The sleeve 162 (or any other sleeve disclosed herein) may have an angular or contoured shape.

The sleeve 162 has an opening 170 at the upper end 166 and may be open at the lower end 168, or closed with a bottom at the lower end 168. The sleeve 162 also has an inner peripheral surface 172 which, when the sleeve 162 is opened, defines and encompasses an inner retaining space 174. When the lower end 168 of the sleeve 162 has a closed lower end 168, a portion of the lower end 168 may be inwardly folded to form one or more gussets (not shown) for allowing the lower portion of the inner retaining space 174 to be expandable, for example, for receiving the circular bottom of a pot or growing medium.

The sleeve 162 is generally frusto-conically shaped, but the sleeve 162 may be, by way of example but not by way of limitation, cylindrical, frusto-conical, a combination of both frusto-conical and cylindrical, or any other shape, as long as the sleeve 162 functions as described herein as noted above. Further, the sleeve 162 may comprise any shape, whether geometric, non-geometric, asymmetrical and/or fanciful as long as it functions in accordance with the present invention. The sleeve 162 may also be equipped with drain holes (if having a closed bottom) or side ventilation holes (not shown), or can be made from gas permeable or impermeable materials.

The material from which the sleeve 162 is constructed is the same as previously described above for the sheet of polymeric material 10 having a cloth-like appearance, or the sheet of flexible material 112 or 112a. Any thickness of material may be utilized in accordance with the present invention as long as the sleeve 162 may be formed as described herein, is provided with a cloth-like appearance, and as long as the formed sleeve 162 may contain at least a portion of a flower pot or a floral grouping, as described herein. Additionally, an insulating material such as bubble film, preferable as one of two or more layers, can be utilized in order to provide additional protection for the item, such as a floral grouping, contained therein.

In FIG. 14 the sleeve 162 is illustrated having a cloth like appearance provided on the outer peripheral surface 164 of the sleeve 162. A floral grouping 176 is disposed within the inner retaining space 174 of the sleeve 162. Generally, an upper or bloom portion 178 of the floral grouping 176 is exposed near the opening 170 of the sleeve 162 and a lower or stem portion 180 of the floral grouping 176 is exposed near the lower end 168 of the sleeve 162. Either end of the sleeve 162 may be closed about the floral grouping 176. Generally, a portion of the sleeve 162 is tightened about a portion of the stem portion 180 of the floral grouping 176 for holding the decorative cover 160 about the floral grouping 176. For example, the sleeve 162 may be held by a tie 182 tied about the sleeve 162 such as is shown in FIG. 14. Other methods for binding the sleeve 162 may be employed such as the bonding methods and materials described elsewhere herein. For example, as shown in FIG. 15, a decorative cover 160a is shown which comprises a sleeve 162a having a cloth-like appearance and a cinching tab 184 having a bonding material 186 disposed upon a surface thereof. The cinching tab 184 can be used to gather portions of the sleeve 162a together about the stem portion 180 of the floral grouping 176 as shown in FIG. 16 for holding the sleeve 162a tightly about the floral grouping 176.

Similarly, it may generally be desired to use the sleeve 162 as a decorative cover for a flower pot (not shown). The flower pot will generally contain a botanical item or plant. The flower pot can be deposited into the open sleeve 162 in a manner well known in the art, such as manually wherein the sleeve 162 is opened by hand and the flower pot deposited therein.

As noted above, a bonding material may be disposed on a portion of the sleeve 162 or any sleeve described herein to assist in holding the sleeve 162 to the flower pot when the flower pot is disposed within the sleeve 162 or to assist in closing the upper end 166 of the sleeve 162 or adhering the sleeve 162 to the flower pot after the flower pot has been disposed therein, as will be discussed in further detail below.

It will be understood that the bonding material, if present, may be disposed as a strip or block on a surface of the sleeve 162. The bonding material may also be disposed upon either the outer peripheral surface 164 or the inner peripheral surface 172 of the sleeve 162, as well as upon the flower pot. Further, the bonding material may be disposed as spots of bonding material, or in any other geometric, non-geometric, asymmetric, or fanciful form, and in any pattern, including covering either the entire inner peripheral surface 172 and/or outer peripheral surface 164 of the sleeve 162 and/or the flower pot. The bonding material may be covered by a cover or release strip which can be removed prior to the use of the sleeve 162 or flower pot. The bonding material can be applied by methods known to those of ordinary skill in their art. One method for disposing a bonding material, in this case an adhesive, is described in U.S. Pat. No. 5,111,637, entitled "METHOD FOR WRAPPING A FLORAL GROUPING", issued to Weder et al. on May 12, 1993, which is hereby expressly incorporated herein by reference.

As noted above, a bonding material may be disposed on at least a portion of the inner peripheral surface 172 of the sleeve 162 (or any other sleeve described herein), or, alternatively, the bonding material may be disposed on the outer peripheral surface of a flower pot contained within the sleeve 162, while the sleeve 162 may be free of the bonding material. In a further alternative, the bonding material may be disposed both on at least a portion of the flower pot as well as upon at least a portion of the inner peripheral surface 172 of the sleeve 162. In addition, a portion of the bonding material may also be disposed on the outer peripheral surface 164 of the sleeve 162 as well. It will be understood that the bonding material may be disposed in a solid section of bonding material. The bonding material, when present, is disposed on the sleeve 162 and/or flower pot by any method known in the art.

Certain versions of sleeves described herein may be used in combination with a preformed pot cover. For example, a preformed pot cover may be applied to the pot, then the covered pot wrapped or disposed within a sleeve. Either the cover or the sleeve, or both, may have a cloth-like appearance. Examples of sleeves which may be used in this invention are shown in the specification of U.S. Pat. No. 5,625,979, entitled "SLEEVE HAVING A DETACHABLE PORTION FORMING A SKIRT AND METHODS", issued to Weder on May 6, 1997, which is expressly incorporated herein by reference in its entirety. Equipment and devices for forming sleeves are commercially available, and well known in the art.

Figure 17:
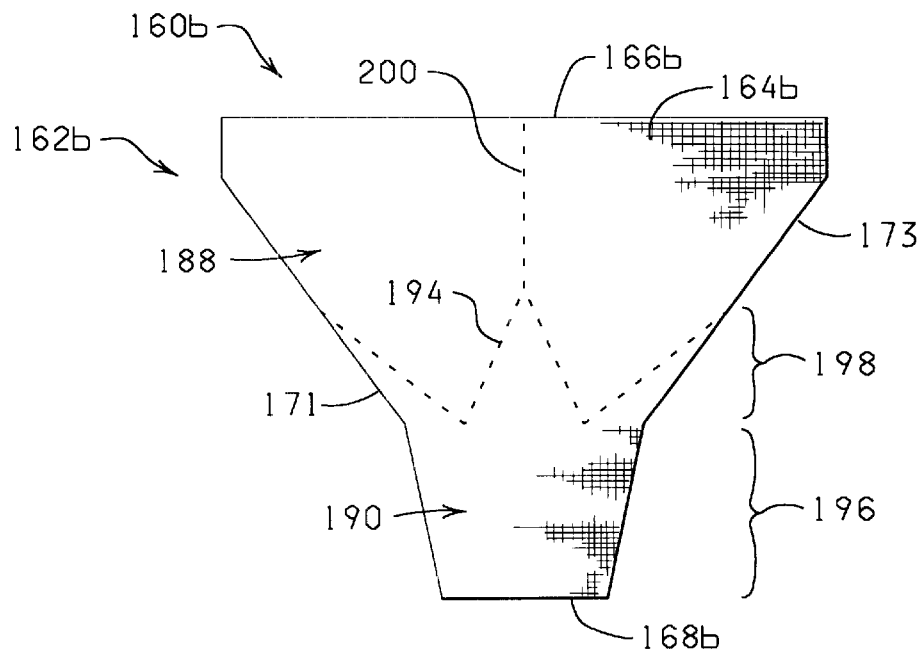
FIG. 17 is a side view of a sleeve having a detachable portion wherein the sleeve is formed from a sheet of polymeric material having a cloth-appearing finish on a surface thereof.
Figure 18:
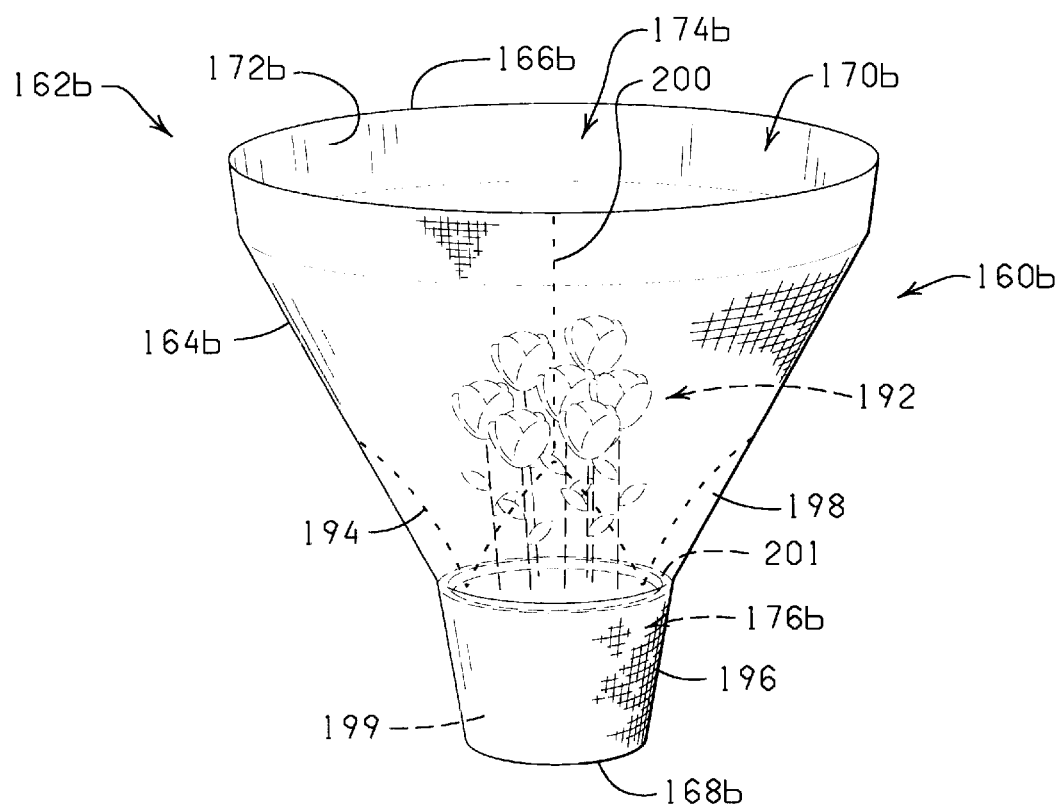
FIG. 18 is a perspective view of the sleeve of FIG. 17 having a flower pot disposed therein.

Shown in FIGS. 17 and 18 is another embodiment of a decorative cover 160b comprising a sleeve having a cloth-like appearance constructed in accordance with the present invention and designated by the general reference numeral 162b. The sleeve 162b has a "detaching" element in predetermined areas for detaching a portion of the sleeve 162b. The sleeve 162b generally initially comprises a flexible flat collapsed piece of material which is openable in the form of a tube or sleeve. The sleeve 162b is constructed of the same material and in the same way as described previously herein and may be described exactly the same as the other sleeves described herein except for the additional elements described hereinafter.

The sleeve 162b has an upper end 166b, a lower end 168b, and an outer peripheral surface 164b. The sleeve 162b has an opening 170b at the upper end 166b thereof, and the sleeve 162b may be open at the lower end 168b or closed with a bottom at the lower end 168b. In a flattened state, the sleeve 162b has a first side 171 and a second side 173. The sleeve 162b also has an inner peripheral surface 172b which, when the sleeve 162b is opened, defines and encompasses an inner retaining space 174b as shown in FIG. 18. When the lower end 168b of the sleeve 162b has a closed bottom, a portion of the lower end 168b may be inwardly folded to form one or more gussets (not shown) for permitting a circular bottom of an object such as a potted plant 176b to be disposed in the inner retaining space 174b of the lower end 168b of the sleeve 162b.

As shown in FIGS. 17 and 18, the sleeve 162b is demarcated into an upper portion 188 and a lower portion 190. The lower portion 190 of the sleeve 162b is generally sized to contain the flower pot 176b. The upper portion 188 of the sleeve 162b is sized to substantially surround and encompass a plant 192 contained in the flower pot 176b disposed within the lower portion 190 of the sleeve 162b. The sleeve 162b is demarcated into the upper portion 188 and the lower portion 190 by a detaching element 194 for enabling the detachment of the upper portion 188 of the sleeve 162b from the lower portion 190 of the sleeve 162b. In the present version, the detaching element 194 is a plurality of generally laterally-oriented or alternatingly diagonally-oriented perforations which extend circumferentially across the outer peripheral surface 164b of the sleeve 162b from the first side 171 to the second side 173.

In a preferred embodiment, as shown in FIGS. 17 and 18, the lower portion 190 of the sleeve 162b further comprises a base portion 196 and a skirt portion 198. The base portion 196 comprises that part of the lower portion 190 which, when the flower pot 176b is placed into the lower portion 190, has an inner peripheral surface 172b which is substantially adjacent to and surrounds an outer peripheral surface 199 of the flower pot 176b. The skirt portion 198 comprises that part of the lower portion 190 which extends beyond an open upper end 201 of the flower pot 176b and adjacent at least a portion of the plant 192 contained within the flower pot 176b and which is left to freely extend at an angle, inwardly or outwardly, from the base portion 196 when the upper portion 188 of the sleeve 162b is detached from the lower portion 190 of the sleeve 162b by actuation of the detaching element 194.

In the intact sleeve 162b, the skirt portion 198 comprises an upper peripheral edge congruent with the detaching element 194 which is connected to a lower peripheral edge, also congruent with the detaching element 194, of the upper portion 188 of the sleeve 162b. In FIGS. 17 and 18, the upper peripheral edge of the skirt portion 198 is congruent with a series of alternatingly diagonally-oriented lines of perforations which together form a zig-zag and comprise the detaching element 194. The upper portion 188 of the sleeve 162b may also have an additional detaching element 200 indicated as a plurality of vertical perforations for facilitating removal of the upper portion 188 and which are disposed more or less vertically therein extending between the detaching element 194 of the sleeve 162b.

The upper portion 188 of the sleeve 162b is thereby separable from the lower portion 190 of the sleeve 162b by tearing the upper portion 188 along both the detaching element 200 and the detaching element 194, thereby separating the upper portion 188 from the lower portion 190 of the sleeve 162b. The lower portion 190 of the sleeve 162b remains disposed as the base portion 196 about the flower pot 176b and as the skirt portion 198 about the plant 192 forming a decorative cover 202 as shown in FIG. 19 which substantially surrounds and encompasses the flower pot 176b and the plant 192 contained therein. An outer peripheral surface 164b of the lower portion 190 of the sleeve 162b, for example, the base and skirt portions 196 and 198, may be modified to provide the lower portion 190 of the sleeve 162b with a cloth-like appearance, while the upper portion 188 is left unmodified or is printed with a design. When the upper portion 188 is detached, the lower portion 190 of the sleeve 162b remains about the flower pot 176b and thereby forms a decorative cover 202 about the flower pot 176b which has the appearance of a cloth decorative cover.

"Detaching element" as used herein, includes any element, or combination of elements, or features, such as, but not by way of limitation, perforations, tear strips, zippers, and any other devices or elements of this nature known in the art, or any combination thereof. Therefore, while perforations are shown and described in detail herein, it will be understood that tear strips, zippers, or any other "detaching elements" known in the art, or any combination thereof, could be substituted therefor and/or used therewith.

In a general method of use of sleeve 162b as a decorative cover for a flower pot, an operator provides a sleeve 162b, and the flower pot 176b having a plant 192 disposed in a growing medium contained within the flower pot 176b. The operator then disposes the flower pot 176b having the plant 192 contained therein into the sleeve 162b by opening the sleeve 162b at its upper end 166b and assuring both that the opening 170b therein is in an open condition, and that the inner peripheral surface 172b of the sleeve 162b is somewhat expanded outward as well, as shown in FIG. 18. The operator then manually or automatically disposes the flower pot 176b into the opening 170b in the sleeve 162b, the flower pot 176b being disposed generally through the upper portion 188 of the sleeve 162b into generally the lower portion 190 of the sleeve 162b, the flower pot 176b remaining in the lower portion 190 of the sleeve 162b, permitting the sleeve 162b to substantially surround and tightly encompass the flower pot 176b. It will be understood that alternatively, the sleeve 162b may be provided with an extension (not shown), and the sleeve 162b may be disposed on rods or wickets, and the flower pot 176b may be disposed in the sleeve 162b either before or after the sleeve 162b has been removed from the wickets.

Embodiments of FIGS. 20A–20C

Referring now to FIG. 20A, designated generally by the reference numeral 210 is a polymeric ribbon material having a cloth-like appearance for forming decorative bows and for wrapping items. That is, at least one surface of a web of polymeric material (not shown) is modified to provide a matte or textured finish 212 simulating the appearance of cloth. The modification of the web of polymeric material (not shown) to provide the polymeric ribbon material 210 with a matte or textured finish 212 can be accomplished in several ways. For example, the polymeric ribbon material 210 having the matte or textured finish 212 can be produced by printing a web of polymeric material with a matted (i.e.

dull finish) ink, by lacquering at least one surface of the sheet of polymeric material with a dull finish lacquer or a matting lacquer, by embossing the sheet of polymeric material to provide an embossed pattern simulating the weave or texture of cloth, or by flocking the sheet of polymeric material, or by application of a foamable lacquer or foamable ink to the sheet of polymeric material, or by embossing and printing the sheet of polymeric material to provide embossed and printed patterns wherein the embossed and printed patterns may be in registry, out of registry or wherein a portion of the embossed and printed patterns are in registry and a portion of the embossed and printed patterns are out of registry. In addition, a matte or textured finish 212 capable of providing the sheet of polymeric material 210 with a cloth-like appearance can be achieved by extruding a polymeric resin onto a matted or textured chill roll. Thereafter, the web of material having a cloth-like appearance can be cut in a conventional manner to provide the polymeric ribbon material 210 having a cloth-like appearance.

Any polymeric material capable of being textured or otherwise modified to provide the polymeric material with a cloth-like appearance can be employed in the formulation of the polymeric ribbon material 210. For example, the polymeric material employed to produce the polymeric ribbon material 210 can be polypropylene film having a thickness in a range of from about 0.1 mil to about 30 mil, and more desirably in a range of from about 0.5 mil to about 2.5 mil, or an expanded core polymeric film having a thickness in a range of from about 0.6 mil to about 10 mil.

Referring now to FIG. 20B, designated generally by the reference numeral 220 is another embodiment of a polymeric ribbon material for forming decorative bows and for wrapping items. The polymeric ribbon material 220 comprises an expanded core polymeric film 222 having a thickness in a range of from about 0.6 mil to about 10 mil and a polymeric film 224 having a thickness in a range of from about 0.6 mil to about 10 mil. The polymeric film 224 is desirably laminated to the expanded core polymeric film 222 with a colored adhesive so as to impart a desired color to the polymeric ribbon material 220. If desired the polymeric ribbon material 220 may be treated or otherwise processed to provide the polymeric ribbon material 220 with a matte or textured finish 226 simulating the weave or knit of cloth so that the polymeric ribbon material 220 has a cloth like appearance similar to the polymeric ribbon material 210 hereinbefore described with reference to FIG. 20A. That is, a matte or textured finish 226 simulating cloth can be printed on the expanded core polymeric film 222, and thereafter the polymeric film 224 (which in this case is desirably a matte material of translucent polymeric film) is laminated to the polymeric film 224 to provide the polymeric ribbon material 220 with a cloth-like appearance. To further enhance the cloth-like appearance of the polymeric ribbon material 220, the polymeric film 224 may or may not have a plurality of spatially disposed holes extending therethrough. The matte or textured finish 226 can be produced by printing the polymeric film 224 laminated to the expanded core polymeric film 222 with a matted (i.e. dull finish) ink, by lacquering at least one surface of the polymeric film 224 with a dull finish lacquer or a matting lacquer, by flocking the polymeric film 224, by application of a foamable lacquer or foamable ink to the polymeric film 224, by embossing the polymeric film 224 to provide an embossed pattern simulating the weave or texture of cloth, or by embossing and printing the polymeric film 224 to provide embossed and printed patterns wherein the embossed and printed patterns may be in registry, out of registry, or wherein a portion of the embossed and printed patterns are in registry and a portion of the embossed and printed patterns are out of registry. In addition, a matte or textured finish 226 capable of providing the polymeric ribbon material 220 with a cloth-like appearance can be achieved by extruding the resin used to produce the expanded core polymeric film 222 and/or the resin used to produce the polymeric film 224 onto a matted or textured chill roll.

Referring now to FIG. 20C, designated generally by the reference numeral 230 is another embodiment of a polymeric ribbon material for forming decorative bows and for wrapping items. The polymeric ribbon material 230 comprises a polymeric film 232 having an upper surface 234, a lower surface 236 and a thickness in the range of from about 0.6 mil to about 10 mil. An acrylic heat sealable lacquer 238 is applied to at least one of the upper and lower surfaces 234 and 236 of the polymeric film 232, such as the lower surface 236 of the polymeric film 232 and the upper surface 234 of the polymeric film 232 is desirably modified to provide the polymeric ribbon material 230 with a matte or textured finish 240 simulating the appearance of cloth. The modification of the polymeric film 232 to provide the polymeric ribbon material 230 with a cloth-like appearance can be accomplished in several ways. For example, the polymeric ribbon material 230 having the matte or textured finish 240 can be produced by printing a web of polymeric material with a matted (i.e. dull finish) ink, by lacquering at least one of the upper surface 234 or the lower surface 236 of the polymeric film 232 with a dull finish lacquer or a matting lacquer, by flocking the polymeric film 232, by application of a foamable lacquer or foamable ink to the polymeric film 232, by embossing the polymeric film 232 to provide an embossed pattern simulating the weave or texture of cloth, or by embossing and printing the polymeric film 232 to provide embossed and printed patterns wherein the embossed and printed patterns may be in registry, out of registry or wherein a portion of the embossed and printed patterns are in registry and a portion of the embossed and printed patterns are out of registry. In addition, a matte or textured finish 240 capable of providing the polymeric film 232 with a cloth-like appearance can be achieved by extruding a polymeric resin onto a matted or textured chill roll. Thereafter, the polymeric film 232 having a cloth-like appearance can be cut in a conventional manner to provide the polymeric ribbon material 280.

Any polymeric film capable of being textured or otherwise modified to provide the polymeric material with a cloth-like appearance can be employed in the formulation of the polymeric ribbon material 230. For example, the polymeric film 232 employed to produce the polymeric ribbon material 230 can be polypropylene film having a thickness in a range of from about 0.1 mil to about 30 mil, and more desirably in a range of from about 0.5 mil to about 2.5 mil, or an expanded core polymeric film having a thickness in a range of from about 0.6 mil to about 10 mil.

Changes may be made in the construction and the operation of the various components, elements and assemblies described herein or in the steps or the sequence of steps of the methods described herein without departing from the spirit and scope of the invention as defined in the following claims.

What is claimed:

1. A decorative preformed flower pot cover having a textured or matte finish simulating the appearance of cloth on at least a portion of one surface thereof, the decorative preformed flower pot cover comprising a base having a lower end, an open upper end, an outer peripheral surface, an inner peripheral surface and a retaining space and a decorative border extending outwardly from the open upper end of the base, the base of the decorative preformed flower pot cover having a plurality of overlapping folds of which at least a portion are permanently connected so that the decorative preformed flower pot cover may be substantially flattened and then unflattened to assume the original shape of the decorative preformed flower pot cover, the decorative preformed flower pot cover formed of a sheet of polymeric material comprising:

a sheet of polymeric material having an upper surface and a lower surface wherein at least a portion of one of the upper surface and the lower surface of the sheet of polymeric material is embossed, printed, or embossed and printed to provide such surface with a textured or matte finish simulating the appearance of cloth such that at least a portion of one surface of at least one of the base and decorative border of the decorative preformed flower pot cover formed therefrom is provided with a textured or matte finish simulating the appearance of cloth.

2. A decorative preformed flower pot cover having a textured or matte finish simulating the appearance of cloth on at least a portion of one surface thereof, the decorative preformed flower pot cover comprising a base having a lower end, an open upper end, an outer peripheral surface, an inner peripheral surface and a retaining space and a decorative border extending outwardly from the open upper end of the base, the base of the decorative preformed flower pot cover having a plurality of overlapping folds of which at least a portion are permanently connected so that the decorative preformed flower pot cover may be substantially flattened and then unflattened to assume the original shape of the decorative preformed flower pot cover, the decorative preformed flower pot cover formed of a sheet of polymeric material comprising:

an expanded core polymeric film having an upper surface, a lower surface, and a thickness in the range of from about 0.6 mil to about 10 mil wherein at least a portion of one of the upper and lower surfaces of the expanded core polymeric film is modified to provide a textured or matte finish simulating the appearance of cloth such that at least a portion of one surface of at least one of the base and the decorative border of the decorative preformed flower pot cover is provided with a textured or matte finish simulating the appearance of cloth.

3. The decorative preformed flower pot cover of claim 2 wherein at least a portion of one of the upper and lower surfaces of the expanded core polymeric film is printed, embossed, or printed and embossed to provide the textured or matte finish simulating the appearance of cloth.

4. The decorative preformed flower pot cover of claim 3 wherein the textured or matte finish simulating the appearance of cloth is provided by printing a pattern on at least a portion of one of the upper and lower surfaces of the expanded core polymeric film and embossing a pattern on at least a portion of one of the upper and lower surfaces of the expanded core polymeric film, and the printed and embossed patterns are in registry with one another.

5. The decorative preformed flower pot cover of claim 3 wherein the textured or matte finish simulating the appearance of cloth is provided by printing a pattern on at least a portion of one of the upper and lower surfaces of the expanded core polymeric film and embossing a pattern on at least a portion of one of the upper and lower surfaces of the expanded core polymeric film, and the printed and embossed patterns are out of registry with one another.

6. A decorative preformed flower pot cover having a textured or matte finish simulating the appearance of cloth on at least a portion of one surface thereof, the decorative preformed flower pot cover comprising a base having a lower end, an open upper end, an outer peripheral surface, an inner peripheral surface and a retaining space and a decorative border extending outwardly from the open upper end of the base, the base of the decorative preformed flower pot cover having a plurality of overlapping folds of which at least a portion are permanently connected so that the decorative preformed flower pot cover may be substantially flattened and then unflattened to assume the original shape of the decorative preformed flower pot cover, the decorative preformed flower pot cover formed of a sheet of polymeric material comprising:

an expanded core polymeric film having an upper surface, a lower surface, and a thickness in the range of from about 0.6 mil to about 10 mil, wherein at least a portion of one of the upper and lower surfaces of the expanded core polymeric film is printed to provide the expanded core polymeric material with a textured or matte finish simulating the appearance of cloth such that at least a portion of one surface of at least one of the base and decorative border of the decorative preformed flower pot cover is provided with a textured or matte finish simulating the appearance of cloth.

7. A decorative preformed flower pot cover having a textured or matte finish simulating the appearance of cloth on at least a portion of one surface thereof, the decorative preformed flower pot cover comprising a base having a lower end, an open upper end, an outer peripheral surface, an inner peripheral surface and a retaining space and a decorative border extending outwardly from the open upper end of the base, the base of the decorative preformed flower pot cover having a plurality of overlapping folds of which at least a portion are permanently connected so that the decorative preformed flower pot cover may be substantially flattened and then unflattened to assume the original shape of the decorative preformed flower pot cover, the decorative preformed flower pot cover formed of a sheet of polymeric material comprising:

an expanded core polymeric film having an upper surface and a lower surface wherein at least a portion of one of the upper and lower surfaces of the expanded core polymeric film is provided with an embossed pattern which provides a textured or matte finish simulating the appearance of cloth such that at least a portion of one surface of at least one of the base and decorative border of the decorative preformed flower pot cover formed therefrom is provided with a textured or matte finish simulating the appearance of cloth.

8. The decorative preformed flower pot cover of claim 7 wherein the expanded core polymeric film has a thickness in the range of from about 0.6 mil to about 10 mil.

9. A decorative preformed flower pot cover having a textured or matte finish simulating the appearance of cloth on at least a portion of one surface thereof, the decorative preformed flower pot cover comprising a base having a lower end, an open upper end, an outer peripheral surface, an inner peripheral surface and a retaining space and a decorative border extending outwardly from the open upper end of the base, the base of the decorative preformed flower pot cover having a plurality of overlapping folds of which at least a portion are permanently connected so that the decorative preformed flower pot cover may be substantially flattened and then unflattened to assume the original shape of the decorative preformed flower pot cover, the decorative preformed flower pot cover formed of a laminated polymeric material comprising:

- a polymeric film having an upper surface, a lower surface, and a thickness in the range of from about 0.6 mil to about 10 mil; and
- a sheet of material having a thickness in the range of from about 0.6 mil to about 10 mil, the sheet of material laminated to at least one of the upper and lower surfaces of the polymeric film to form the laminated polymeric material, at least a portion of one surface of one of the polymeric film and the sheet of material laminated thereto being modified to provide a textured or matte finish simulating the appearance of cloth so that at least a portion of one surface of the laminated polymeric material and at least a portion of one surface of at least one of the base and decorative border of the decorative preformed flower pot cover formed therefrom are provided with a textured or matte finish simulating the appearance of cloth.

10. The decorative preformed flower pot cover of claim 9 wherein the polymeric film and the sheet of material are laminated with a colored adhesive.

11. The decorative preformed flower pot cover of claim 9 wherein the polymeric film has a thickness in the range of from about 0.6 mil to about 1.25 mil, the sheet of material laminated to the polymeric film has a thickness in the range of from about 0.6 mil to about 1.25 mil, and the laminated polymeric material has a thickness in the range of from about 1.5 mil to about 2.5 mil.

12. A decorative preformed flower pot cover having a textured or matte finish simulating the appearance of cloth on at least a portion of one surface thereof, the decorative preformed flower pot cover comprising a base having a lower end, an open upper end, an outer peripheral surface, an inner peripheral surface and a retaining space and a decorative border extending outwardly from the open upper end of the base, the base of the decorative preformed flower pot cover having a plurality of overlapping folds of which at least a portion are permanently connected so that the decorative preformed flower pot cover may be substantially flattened and then unflattened to assume the original shape of the decorative preformed flower pot cover, the decorative preformed flower pot cover formed of a laminated polymeric material comprising:

- an expanded core polymeric film having a thickness in the range of from about 0.6 mil to about 10 mil, the sheet of material having an upper surface and a lower surface wherein at least a portion of one of the upper and lower surfaces of the expanded core polymeric film is embossed, printed, or embossed and printed to provide such surface with a textured or matte finish simulating the appearance of cloth such that at least a portion of one surface of at least one of the base and decorative border of the decorative preformed flower pot cover formed therefrom is provided with a textured or matte finish simulating the appearance of cloth; and
- a substantially water impervious polymeric film laminated to one surface of the expanded core polymeric film to form the laminated polymeric material, the substantially water impervious polymeric film having a thickness in the range of from about 0.6 mil to about 10 mil.

13. The decorative preformed flower pot cover of claim 12 wherein the expanded core polymeric film and the substantially water impervious polymeric film are laminated with a colored adhesive.

14. The decorative preformed flower pot cover of claim 12 wherein the expanded core polymeric film has a thickness in the range of from about 0.6 mil to about 1.25 mil and wherein the substantially water impervious polymeric film has a thickness in the range of from about 0.6 mil to about 1.25 mil.

15. A decorative preformed flower pot cover having a textured or matte finish simulating the appearance of cloth on at least a portion of one surface thereof, the decorative preformed flower pot cover comprising a base having a lower end, an open upper end, an outer peripheral surface, an inner peripheral surface and a retaining space and a decorative border extending outwardly from the open upper end of the base, the base of the decorative preformed flower pot cover having a plurality of overlapping folds of which at least a portion are permanently connected so that the decorative preformed flower pot cover may be substantially flattened and then unflattened to assume the original shape of the decorative preformed flower pot cover, the decorative preformed flower pot cover formed of a laminated polymeric material comprising:

- a first sheet of polymeric material having a thickness in the range of from about 0.6 mil to about 10 mil, the first sheet of polymeric material having an upper surface and a lower surface wherein at least a portion of the lower surface of the first sheet of polymeric material is provided with embossed, printed, or embossed and printed patterns to provide the lower surface with a textured or matte finish simulating the appearance of cloth such that at least a portion of one surface of at least one of the base and decorative border of the decorative preformed flower pot cover formed therefrom is provided with a textured or matte finish simulating the appearance of cloth; and
- a second sheet of polymeric material laminated to one of the upper and lower surfaces of the first sheet of polymeric material to provide the laminated polymeric material, wherein the embossed, printed, or embossed and printed patterns of the first sheet of polymeric material are visible and thereby provide at least a portion of one surface of the polymeric laminated material with a textured or matte finish simulating the appearance of cloth, the second sheet of polymeric material having a thickness in the range of from about 0.6 mil to about 10 mil.

16. The decorative preformed flower pot cover of claim 15 wherein the first and second sheets of polymeric material are laminated with a colored adhesive.

17. A decorative preformed flower pot cover having a textured or matte finish simulating the appearance of cloth on at least a portion of one surface thereof, the decorative preformed flower pot cover comprising a base having a lower end, an open upper end, an outer peripheral surface, an inner peripheral surface and a retaining space and a decorative border extending outwardly from the open upper end of the base, the base of the decorative preformed flower pot cover having a plurality of overlapping folds of which at least a portion are permanently connected so that the decorative preformed flower pot cover may be substantially flattened and then unflattened to assume the original shape of the decorative preformed flower pot cover, the decorative preformed flower pot cover comprising:

- at least one sheet of polymeric material having at least a portion of one surface thereof modified to provide a textured or matte finish simulating the appearance of cloth such that at least a portion of at least one surface of at least one of the base and the decorative border of the decorative preformed flower pot cover is provided with a textured or matte finish simulating the appearance of cloth, the sheet of polymeric material having a thickness in the range of from about 0.1 mil to about 30 mil, the at least one sheet of polymeric material comprising:

an expanded core polymeric film having an upper surface, a lower surface, and a thickness in the range of from about 0.6 mil to about 10 mil, at least a portion of one surface of the expanded core polymeric film being printed and embossed to provide the textured or matte finish simulating the appearance of cloth, wherein the printed and embossed patterns are in registry with one another; and a substantially water impervious polymeric film laminated to the expanded core polymeric film, the substantially water impervious polymeric film having a thickness in the range of from about 0.6 mil to about 10 mil.

18. A decorative preformed flower pot cover having a textured or matte finish simulating the appearance of cloth on at least a portion of one surface thereof, the decorative preformed flower pot cover comprising a base having a lower end, an open upper end, an outer peripheral surface, an inner peripheral surface and a retaining space and a decorative border extending outwardly from the open upper end of the base, the base of the decorative preformed flower pot cover having a plurality of overlapping folds of which at least a portion are permanently connected so that the decorative preformed flower pot cover may be substantially flattened and then unflattened to assume the original shape of the decorative preformed flower pot cover, the decorative preformed flower pot cover comprising:

at least one sheet of polymeric material having at least a portion of one surface thereof modified to provide a textured or matte finish simulating the appearance of cloth such that at least a portion of at least one surface of at least one of the base and the decorative border of the decorative preformed flower pot cover is provided with a textured or matte finish simulating the appearance of cloth, the sheet of polymeric material having a thickness in the range of from about 0.1 mil to about 30 mil, the at least one sheet of polymeric material comprising:

an expanded core polymeric film having an upper surface, a lower surface, and a thickness in the range of from about 0.6 mil to about 10 mil, at least a portion of one surface of the expanded core polymeric film being printed and embossed to provide the textured or matte finish simulating the appearance of cloth, wherein the printed and embossed patterns are out of registry with one another; and a substantially water impervious polymeric film laminated to the expanded core polymeric film, the substantially water impervious polymeric film having a thickness in the range of from about 0.6 mil to about 10 mil.

19. A decorative preformed flower pot cover having a textured or matte finish simulating the appearance of cloth on at least a portion of one surface thereof, the decorative preformed flower pot cover comprising a base having a lower end, an open upper end, an outer peripheral surface, an inner peripheral surface and a retaining space and a decorative border extending outwardly from the open upper end of the base, the base of the decorative preformed flower pot cover having a plurality of overlapping folds of which at least a portion are permanently connected so that the decorative preformed flower pot cover may be substantially flattened and then unflattened to assume the original shape of the decorative preformed flower pot cover, the decorative preformed flower pot cover comprising:

at least one sheet of polymeric material having at least a portion of one surface thereof modified to provide a textured or matte finish simulating the appearance of cloth such that at least a portion of at least one surface of at least one of the base and the decorative border of the decorative preformed flower pot cover is provided with a textured or matte finish simulating the appearance of cloth, the sheet of polymeric material having a thickness in the range of from about 0.1 mil to about 30 mil, the at least one sheet of polymeric material comprising:

an expanded core polymeric film having an upper surface, a lower surface, and a thickness in the range of from about 0.6 mil to about 10 mil, at least a portion of one surface of the expanded core polymeric film having a textured or matte finish simulating the appearance of cloth; and a substantially water impervious polymeric film laminated to the expanded core polymeric film, the substantially water impervious polymeric film having a thickness in the range of from about 0.6 mil to about 10 mil, and wherein the expanded core polymeric film and the substantially water impervious polymeric film are laminated with a colored adhesive.

20. A decorative preformed flower pot cover having a textured or matte finish simulating the appearance of cloth on at least a portion of one surface thereof, the decorative preformed flower pot cover comprising a base having a lower end, an open upper end, an outer peripheral surface, an inner peripheral surface and a retaining space and a decorative border extending outwardly from the open upper end of the base, the base of the decorative preformed flower pot cover having a plurality of overlapping folds of which at least a portion are permanently connected so that the decorative preformed flower pot cover may be substantially flattened and then unflattened to assume the original shape of the decorative preformed flower pot cover, the decorative preformed flower pot cover comprising:

at least one sheet of polymeric material having at least a portion of one surface thereof modified to provide a textured or matte finish simulating the appearance of cloth such that at least a portion of at least one surface of at least one of the base and the decorative border of the decorative preformed flower pot cover is provided with a textured or matte finish simulating the appearance of cloth, the sheet of polymeric material having a thickness in the range of from about 0.1 mil to about 30 mil, the at least one sheet of polymeric material comprising:

an expanded core polymeric film having an upper surface, a lower surface, and a thickness in the range of from about 0.6 mil to about 1.25 mil, at least a portion of one surface of the expanded core polymeric film having a textured or matte finish simulating the appearance of cloth; and a substantially water impervious polymeric film laminated to the expanded core polymeric film, the substantially water impervious polymeric film having a thickness in the range of from about 0.6 mil to about 1.25 mil.

* * * * *